United States Patent [19]

Nakamura

[11] Patent Number: 5,617,481
[45] Date of Patent: Apr. 1, 1997

[54] ADDRESS READING APPARATUS AND ADDRESS PRINTING APPARATUS USING MAIL ADDRESS POSITION MARK

[75] Inventor: Yoshikatu Nakamura, Yokosuka, Japan

[73] Assignee: Kabushiki Kaisha Toshiba, Kawasaki, Japan

[21] Appl. No.: 407,091

[22] Filed: Mar. 20, 1995

[30]   Foreign Application Priority Data

Mar. 22, 1994   [JP]   Japan .................................. 6-050180

[51] Int. Cl.⁶ ...................................... G06K 9/00
[52] U.S. Cl. .......................... 382/101; 382/175; 382/287
[58] Field of Search ..................... 382/101, 102, 382/175, 287, 291, 292, 317; 395/111, 117; 364/464.02; 235/454, 462, 470; 101/47; 209/900

[56]              References Cited

U.S. PATENT DOCUMENTS

| 3,801,775 | 4/1974  | Acker ........................... 235/61.11 E |
| 4,403,339 | 9/1983  | Wevelsiep et al. ........................ 382/44 |
| 4,481,665 | 11/1984 | Ota ............................................. 382/48 |
| 4,876,000 | 10/1989 | Mikhail ..................................... 209/584 |
| 5,020,117 | 5/1991  | Ooi et al. ................................... 382/46 |
| 5,103,489 | 4/1992  | Miette ........................................ 382/48 |
| 5,307,423 | 4/1994  | Gupta et al. .............................. 382/11 |
| 5,384,886 | 1/1995  | Rourke ..................................... 395/147 |

*Primary Examiner*—Leo Boudreau
*Assistant Examiner*—Andrew W. Johns
*Attorney, Agent, or Firm*—Cushman Darby & Cushman, L.L.P.

[57]                ABSTRACT

This invention is a mail address reading apparatus including a circuit for detecting image data of a mail, a circuit for detecting marks indicating the position of an address area from the image data, and a circuit for specifying the address area of the image data based on the position indicated by the marks and reading the address of the image data in the address area. In this apparatus, the address area can be specified by the detected mark position without causing any problem even if image information other than the address is present and the address can be correctly read.

11 Claims, 19 Drawing Sheets

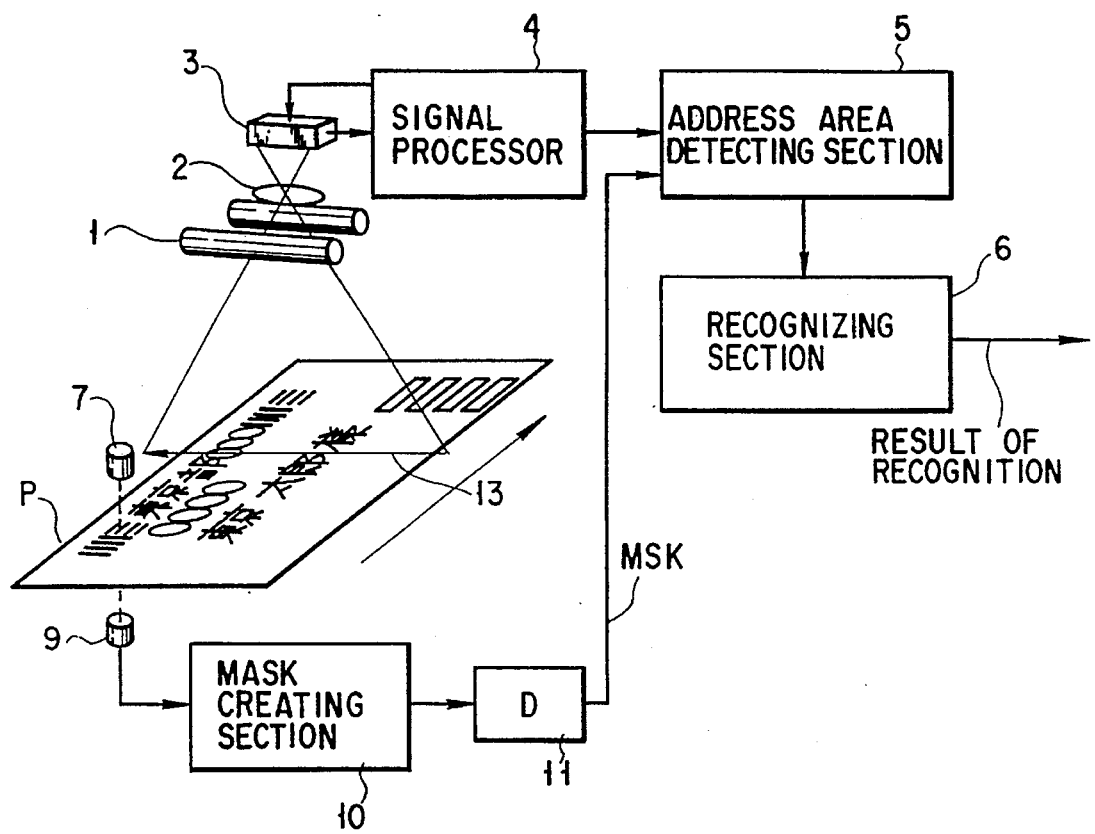
F I G. 1

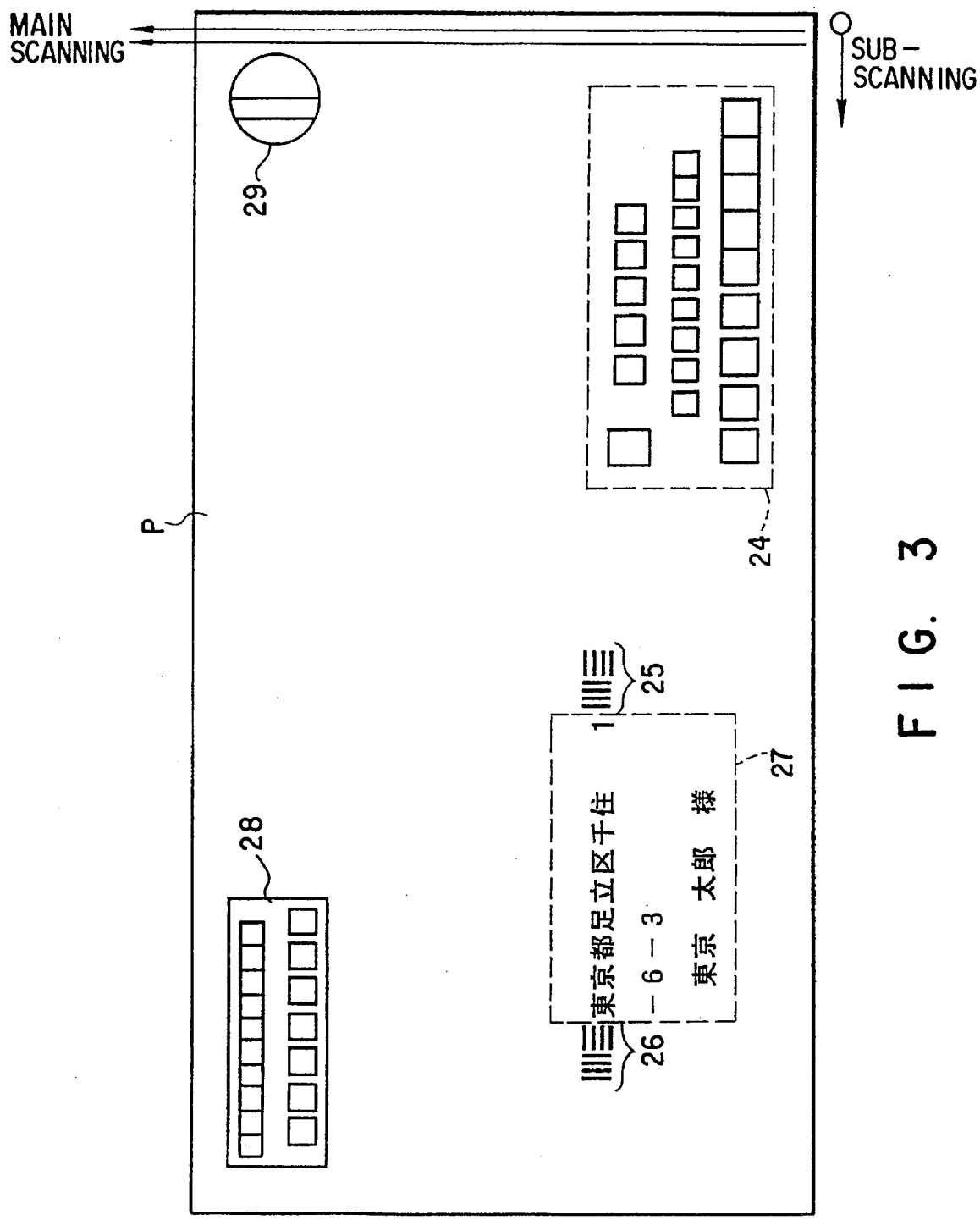
F I G. 3

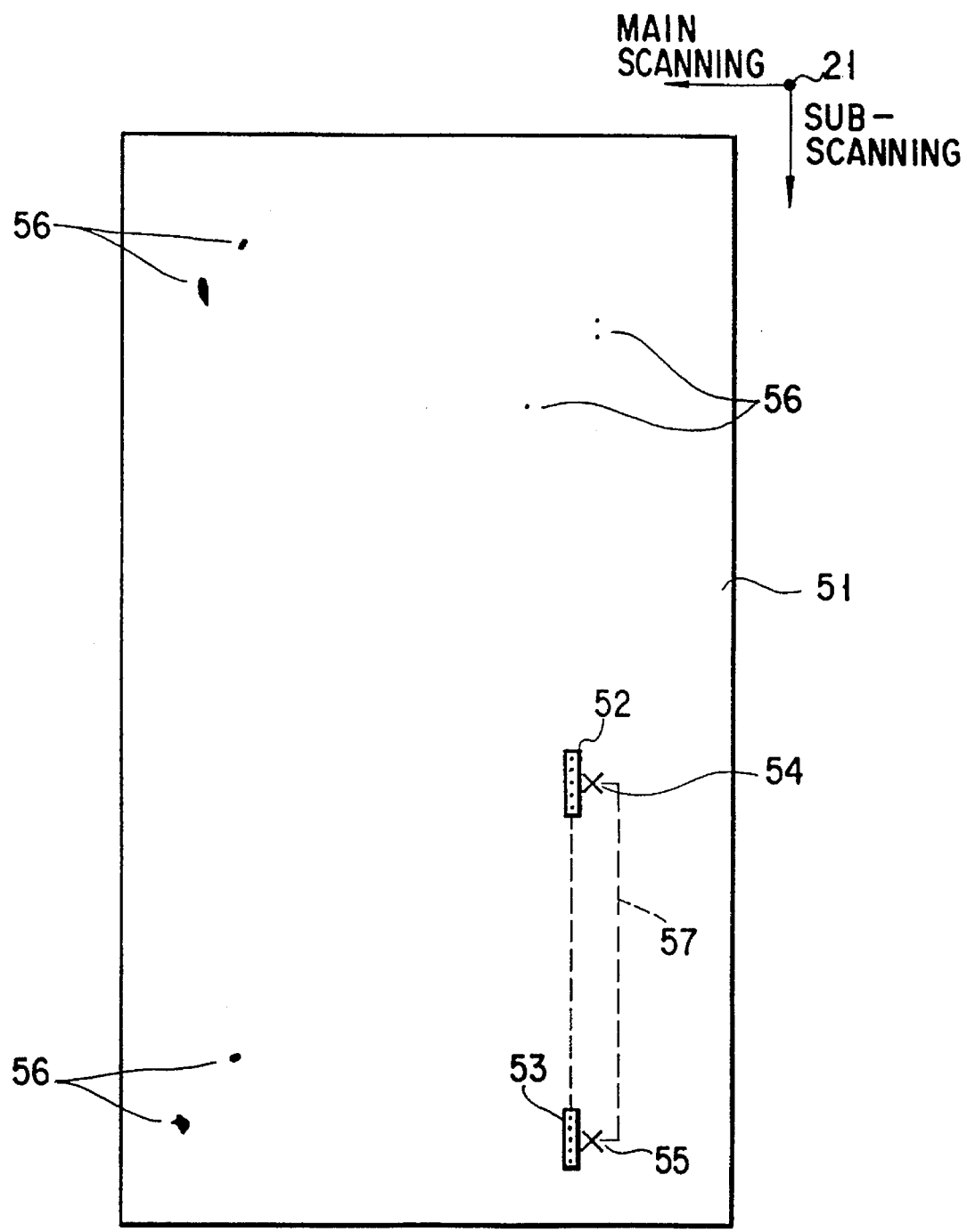
F I G. 5

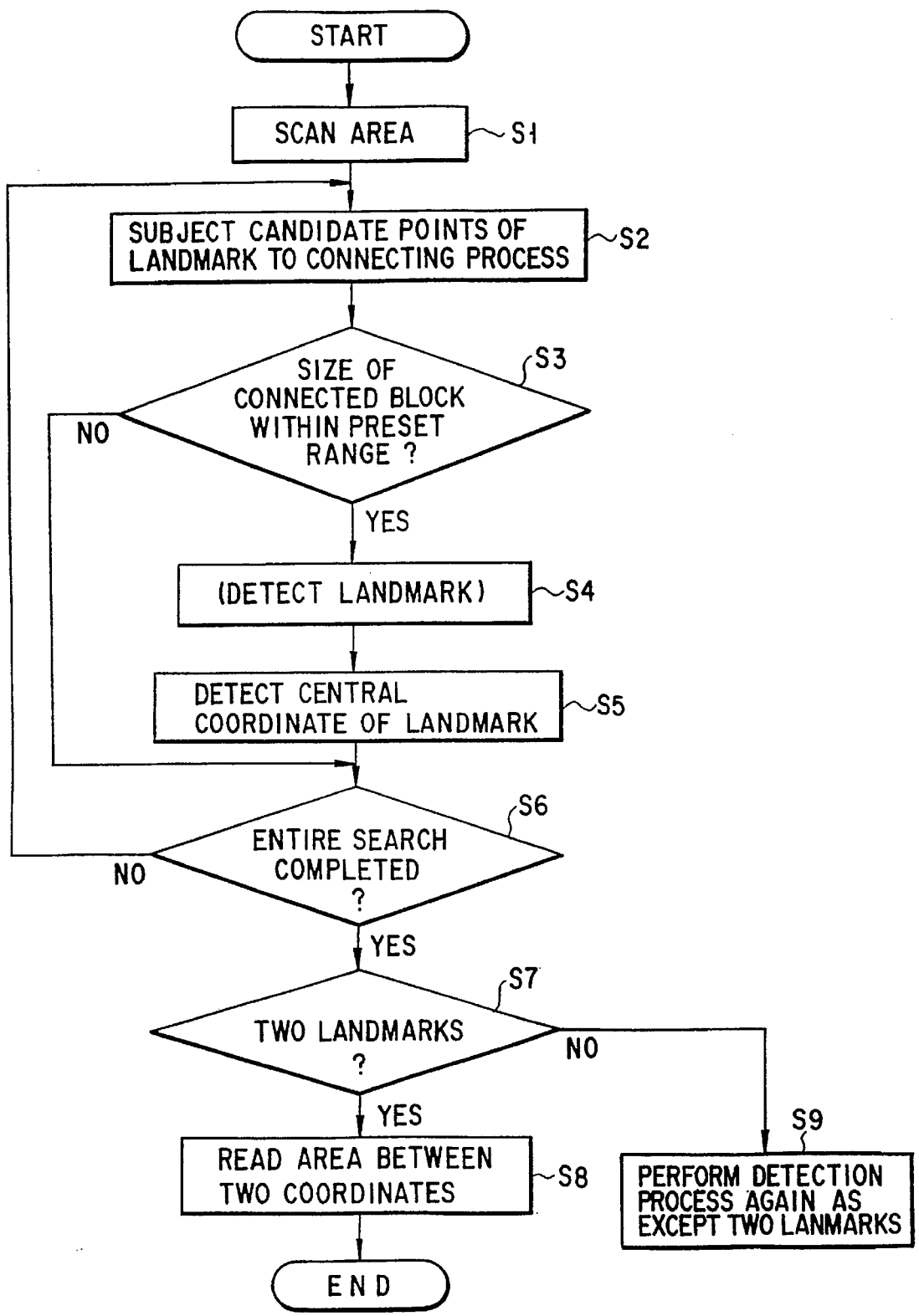
F I G. 8

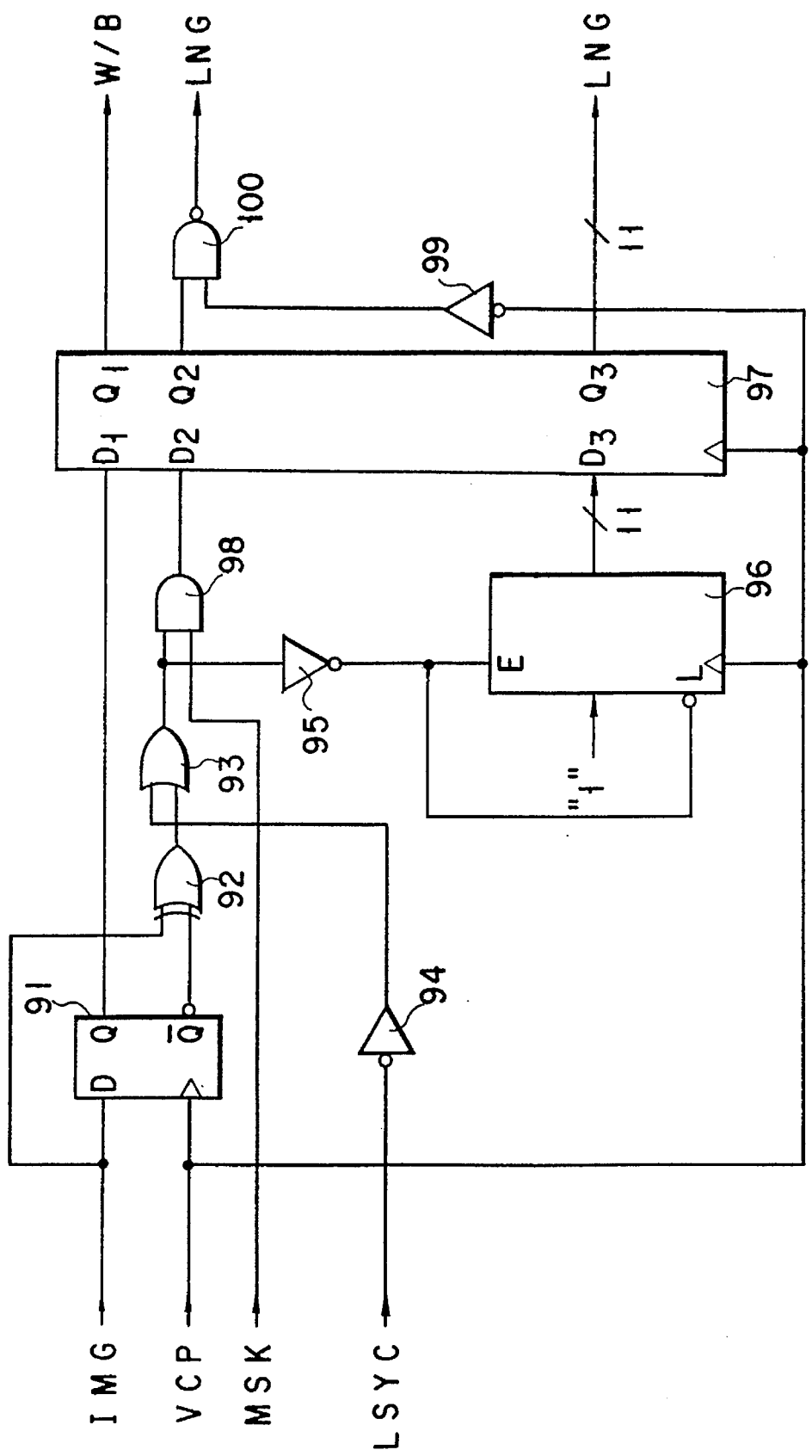
F I G. 10

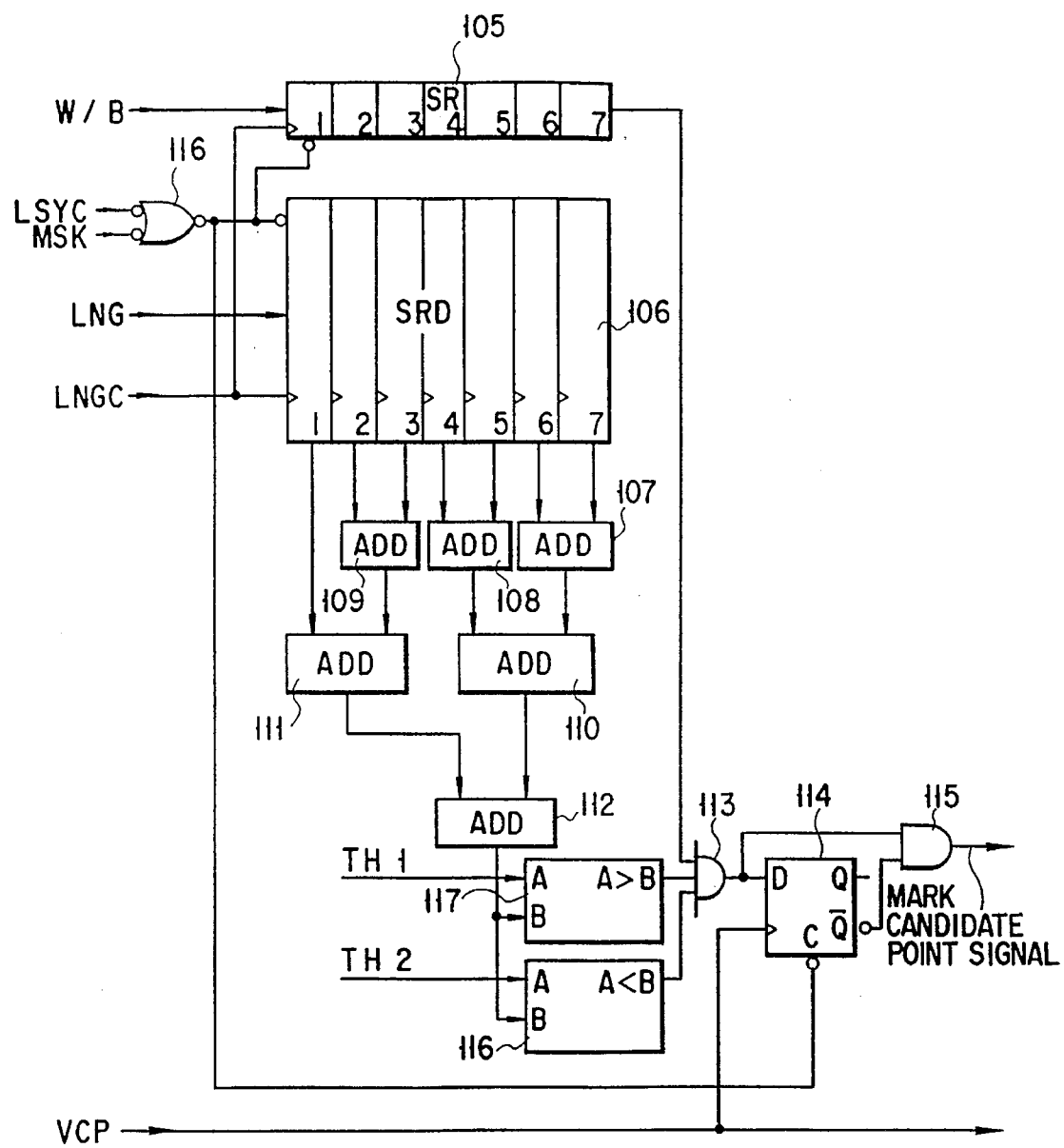
F I G. 12

東京都足立区千住5-2-3

東京　太郎　様

東京都足立区千住5-2-3

東京　太郎　様

東京都足立区千住5-2-3

東京　太郎　様

| | | | |
|---|---|---|---|
| 1 | ․┃ | 0 | ▜┃ |
| 2 | ┃․ | - | ┃▖ |
| 3 | ▖┃ | C | ┃▀ |
| 4 | ┃▘ | D1 | ‖‖ |
| 5 | ▘┃ | D2 | ≡ |
| 6 | ┃. | | |
| 7 | ┃┃ | | |
| 8 | ┃: | | |
| 9 | ▜┃ | | |

F I G. 14

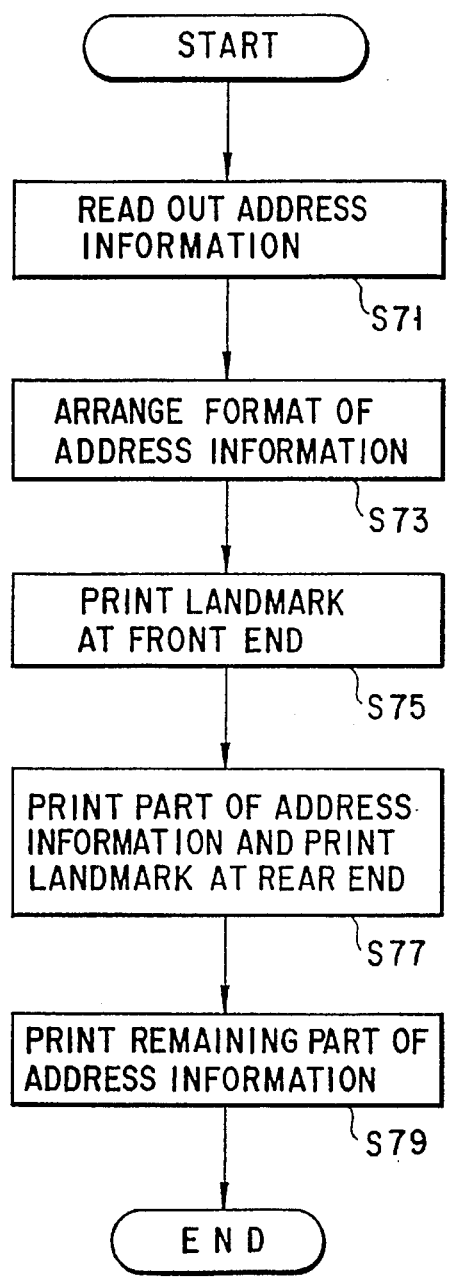
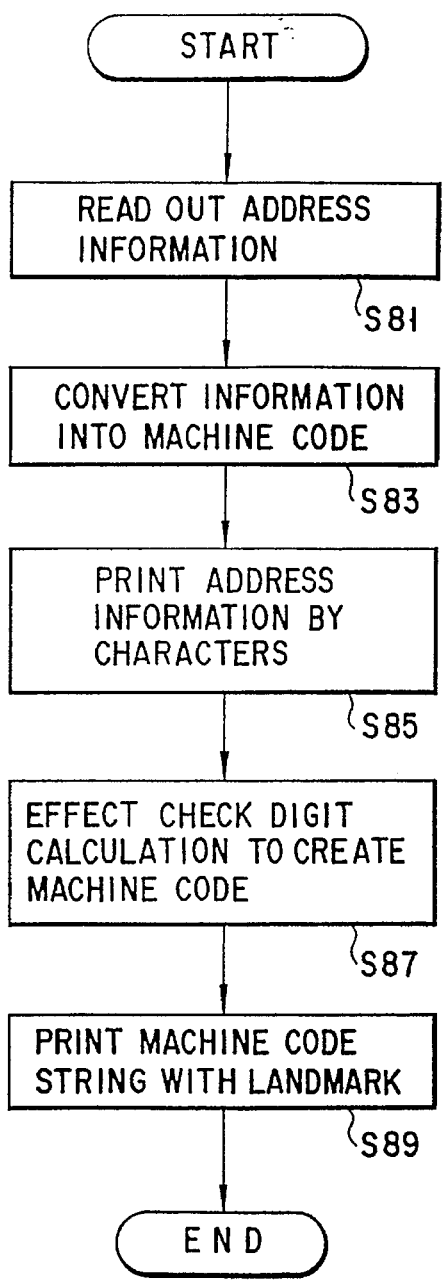
F I G. 18A    F I G. 18B

ADDRESS READING APPARATUS AND ADDRESS PRINTING APPARATUS USING MAIL ADDRESS POSITION MARK

BACKGROUND OF THE INVENTION

1. Field of the Invention

This invention relates to a mail address reading apparatus for optically reading address information on a mail in a mail processing apparatus such as a mail address automatic reading/sorting apparatus.

Further, this invention relates to a mail address area determining apparatus for determining an address area of a mail on which address information is described in a mail processing apparatus such as a mail address automatic reading/sorting apparatus.

Further, this invention relates to a mail address printing apparatus for printing address information on a mail dealt with in the above mail address reading apparatus or mail address area determining apparatus.

2. Description of the Related Art

Conventionally, a mail address reading apparatus in a mail address automatic reading/sorting apparatus for automatically reading address information and sorting mail first extracts image information relating to the description of address information from an area in which the name of a sender, the address, written message and advertisement are also described on the same surface. Next, the apparatus separately detects a character line from the image information, separately detects each character from the detected character line and subjects each character to the recognition process. After this, address information necessary for sorting is derived based on the address knowledge by use of the result of character recognition.

Further, in some countries other than Japan, the sorting performance is obtained by converting address information into a machine code which is machine readable information, printing the machine code on a mail, and reading the machine code instead of using the address characters.

As described above, the technique for separating and detecting the address information of the mail from the other information such as a character image is an important technique in the address reading apparatus, and if the address information is erroneously detected, correct sorting information cannot be obtained. For this reason, various attempts are made in the area detecting process to enhance the possibility that the address information describing area can be correctly detected by providing a framed area, cellophane area, or label area utilizing the difference in density.

Therefore, the amount of processing data in the address reading section becomes extremely large and the size of the apparatus is increased. This can be applied to a case wherein the address information is expressed by a machine code and it is desired to develop a method for more easily and quickly detecting the address information describing area with higher reliability.

SUMMARY OF THE INVENTION

An object of this invention is to provide a mail address reading apparatus and a mail address printing apparatus capable of easily detecting the description format of address information and a to-be-read object area even when various image information items are present together with the to-be-read object on a mail and enhancing the processing speed and the reliability of reading.

The above object can be attained by a mail address reading apparatus for reading an address on mail which has a mark formed in a machine code form, the mark indicates a position of the address area of the mail comprising: means for deriving image data of the mail having an address area; means for detecting the mark from the image data derived by the deriving means; and means for specifying the address area of the image data according to the position indicated by the mark and reading the address for the image data of the specified area.

Further, a mail address printing apparatus comprising means for storing address information of the mail; means for storing image information of a mark indicating the position of the address information; and means for reading the mark and address information stored in the storing means and printing the mark and address information on the mail.

In the mail address reading apparatus of this invention, a plurality of specified marks, which are previously defined and can be easily detected, are printed together with address information on a plurality of end portions of an address information describing range on the mail. By detecting the specified marks when the image information of the mail is detected, for example, the head line of the address information in the image information can be determined, and the address area becomes distinct so that the description format of the address information and the area of the to-be-read object can be easily detected, even if various image information items other than the to-be-read object are present. Thus a mail address reading apparatus capable of enhancing the processing speed and the reliability of reading and correctly reading the address can be attained. Further, it becomes possible to more easily read the address by previously determining the relation between the marks and the description format of the address information.

Further, in the mail address printing apparatus of this invention, the above specified marks are printed on the mail together with address information. Therefore, it becomes possible to provide a printing apparatus in which the processing speed and reliability can be enhanced and which can print information on the mail whose address area can be detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a construction diagram schematically showing the construction of a mail address reading apparatus according to one embodiment of this invention;

FIG. 3 is a plan view showing one example of a mail;

FIG. 5 is a diagram for illustrating landmark candidate points obtained by scanning the mail;

FIG. 8 is a flowchart for illustrating the process for detecting the landmark and reading the address;

FIG. 10 is a logical circuit diagram showing a concrete example of a run-length converting section;

FIG. 12 is a logical circuit diagram showing a concrete example of a mark detecting section;

FIG. 14 is a diagram for illustrating the system of a machine code which expresses address information;

FIG. 18A is a flowchart for illustrating a process in a case wherein address information is printed together with landmarks of this invention; and FIG. 18B is a flowchart for illustrating a process in a case wherein address information is printed together with landmarks of this invention by use of a machine code.

DETAILED DESCRIPTION OF THE PREFERRED EMBODIMENTS

Figure 2:
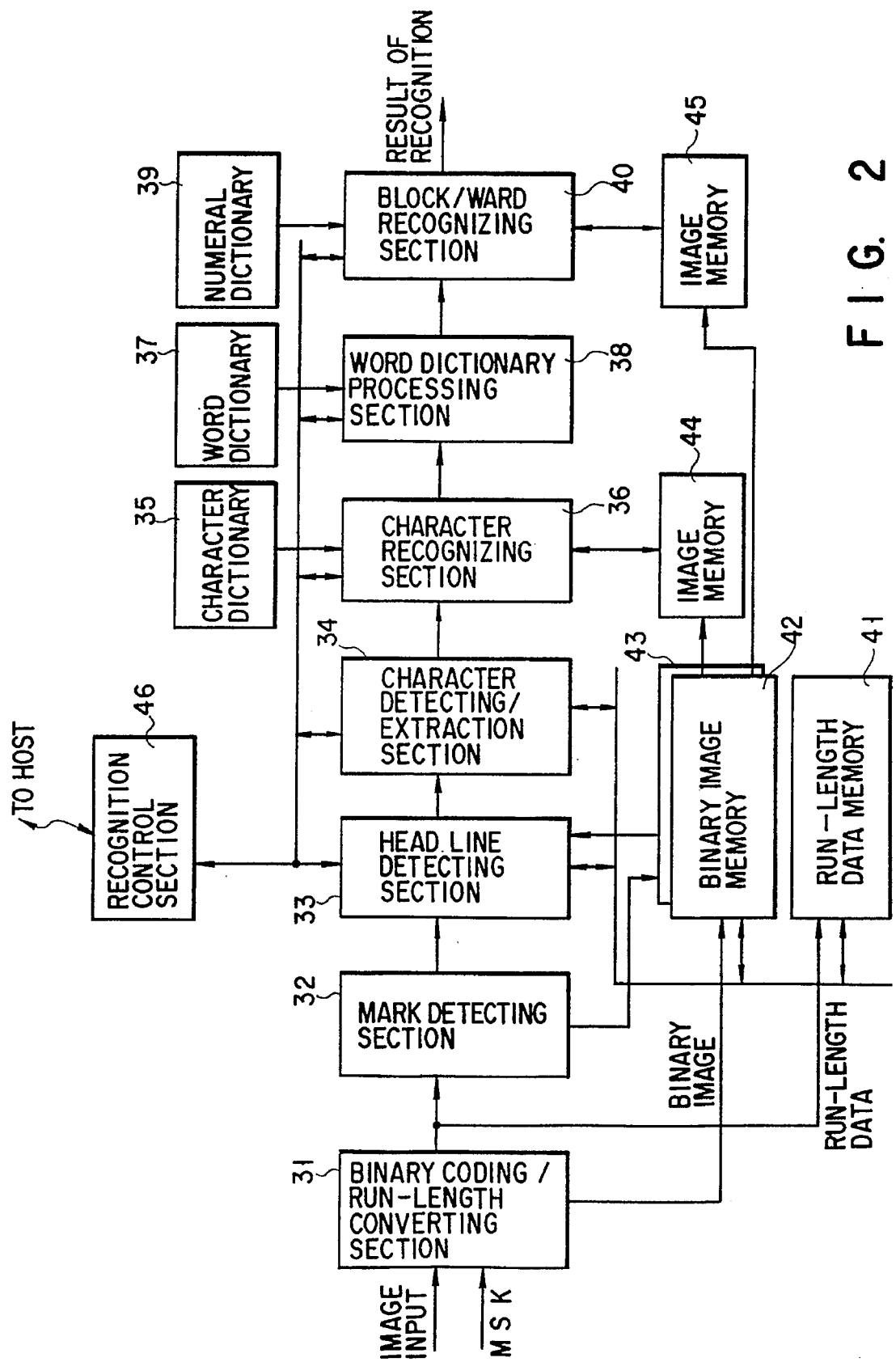
FIG. 2 is a block diagram showing the construction of an object-of-address area detecting section and recognizing section in FIG. 1 in detail.

First, the outline of this invention is explained before explaining an embodiment of this invention. In most of mail, the description form of address information is made by printed characters, and image information items, for example, various characters and patterns such as the name of a sender, advertisement and written message are printed on the same surface as that on which the address information is printed in this type of mail. Therefore, only one candidate of an address information area is determined by subjecting the photographed image of a mail surface to various image processes or the image knowledge process using a description model of address information in order to selectively read address information for mail sorting, and then a character image contained in the thus determined area is recognized. However, the degree of freedom for description of address information of a mail in Japan is high, and therefore, it is extremely difficult to determine only one address information area and address information of a sender may be erroneously read, thereby causing the mail to be erroneously sorted and rejected in many cases.

In this invention, in order to solve the above problem, specified marks (which are hereinafter referred to as landmarks) which can be easily detected and which can define the width of the head line of address information containing a zip code are printed on both end portions of the head line when address information is described by printing on the mail.

There will now be described an embodiment of this invention with reference to the accompanying drawings.

FIG. 3 shows one example of a mail P using the description form of address information having landmarks attached thereto according to this invention. As one example of the landmark, a mark which can be easily detected in synchronism with observation of an image on the mail P and which can cope with the degree of freedom (vertical writing, lateral writing) for description of address information is used. In this example, four equally-spaced vertical stripe codes (bar codes) and horizontal stripe codes (bar codes) obtained by rotating the vertical stripe codes by 90° are simultaneously printed on both sides of the head line of address information as landmarks 25 and 26 by use of images of two characters.

In the example of the mail P, it is assumed that the main scanning is effected in a direction from an origin 21 of the scanning for reading towards the short side of the mail P and the sub-scanning is effected in the lengthwise direction (feeding direction) of the mail P to allow the observation. In this example, an area 24 in which the address of a sender or the like is described, an area 28 in which an advertisement is described, and a mark 26 indicating the separate payment of postage and printed as a nominal value are indicated.

In the description form of address information, if the landmarks 25, 26 are not present, an address information describing area 27 conflicts with a sender's address describing area 24 and has a possibility that a single candidate of the address information describing area may be erroneously detected. In this embodiment, the head line of the address information is determined by attaching the landmarks 25, 26 to the address information and part of the description form is determined by the description order and position of the landmarks 25, 26.

FIG. 1 schematically shows an address reading apparatus according to this embodiment. The mail P described before is fed in a direction indicated by an arrow by feeding means (not shown) and is moved into directly under an observing section 8 used as image input means. The observing section 8 includes a light source 1 for illuminating the mail P, a lens 2 for forming an image according to the light reflected from the mail P, a self-scanning type CCD linear sensor 3 for photoelectrically converting the image formed by the lens 2, and a signal processing section constructed by a driving circuit for driving the linear sensor 3, a waveform shaping circuit for shaping the waveform of an output of the linear sensor 3, and an A/D converter for converting an output subjected to the waveform shaping process into a digital form, and outputs image information on the mail P.

The main scanning of the observing section 8 for the mail P is attained by the self-scanning function of the linear sensor 3 and the sub-scanning thereof is effected by feeding and moving the mail P so as to permit the whole image on the mail P to be observed. The feeding speed of the mail P is constant.

A photodiode 7 and a photosensor 9 are placed in front of the observation line 13 of the mail P and whether or not the mail P has passed between them is detected by the photodiode and photosensor. An output of the photosensor 9 is input to an observing image mask signal creating section 10. The observing image mask signal creating section 10 creates a mask signal of the observing image by measuring the time for interrupting the light to the photosensor 9 by use of a signal which is synchronized with the feeding speed of the mail P.

Since the distance from the photosensor 9 to the observing line 13 is constant, an output signal from the mask signal creating section 10 must be delayed by an amount corresponding to the above positional deviation obtained by observation. Therefore, a mask signal MSK output from the mask signal creating section 10 is input to the address area detecting section 5 via a delay circuit 11. Image information output from the signal processing section 4 is also input to the address area detecting section 5.

The address area detecting section 5 receives a multi-value image signal from the signal processing section 4 in an active period of the mask signal MSK. As the internal processes, the binary-coding process of the multi-value signal, the run-length converting process of the binary signal, the landmark detecting process using run-length data, the landmark determining process, and the process for detecting the area of the head line of address information are effected.

An output of the address area detecting section 5 is input to a recognizing section 6. The recognizing section 6 effects the determining (character detecting) process for determining the character image area described in an area of the head line, the character recognizing process and the knowledge process using address knowledge by determining the area of the head line in the address area detecting section 5, and outputs the result of recognition of address information.

In a case where information required by the address information cannot be determined by the head line area detecting process, a character line following the head line is detected to effect the final recognition of address information.

FIG. 2 shows concrete examples of the address area detecting section 5 and the recognizing section 6 in FIG. 1 in detail. A binary-coding/run-length converting section 31 receives image information from the signal processing section 4 as an input image in the active period of the input mask signal MSK, subjects the received image information to the binary-coding process for conversion into a binary signal constructed by black and white signals, and at the same time, effects the run-length converting process for converting the binary 2-dimensional image as a scanning continuous amount of black signal or a scanning continuous amount of white signal among the binary signal into a data signal.

Figure 4:
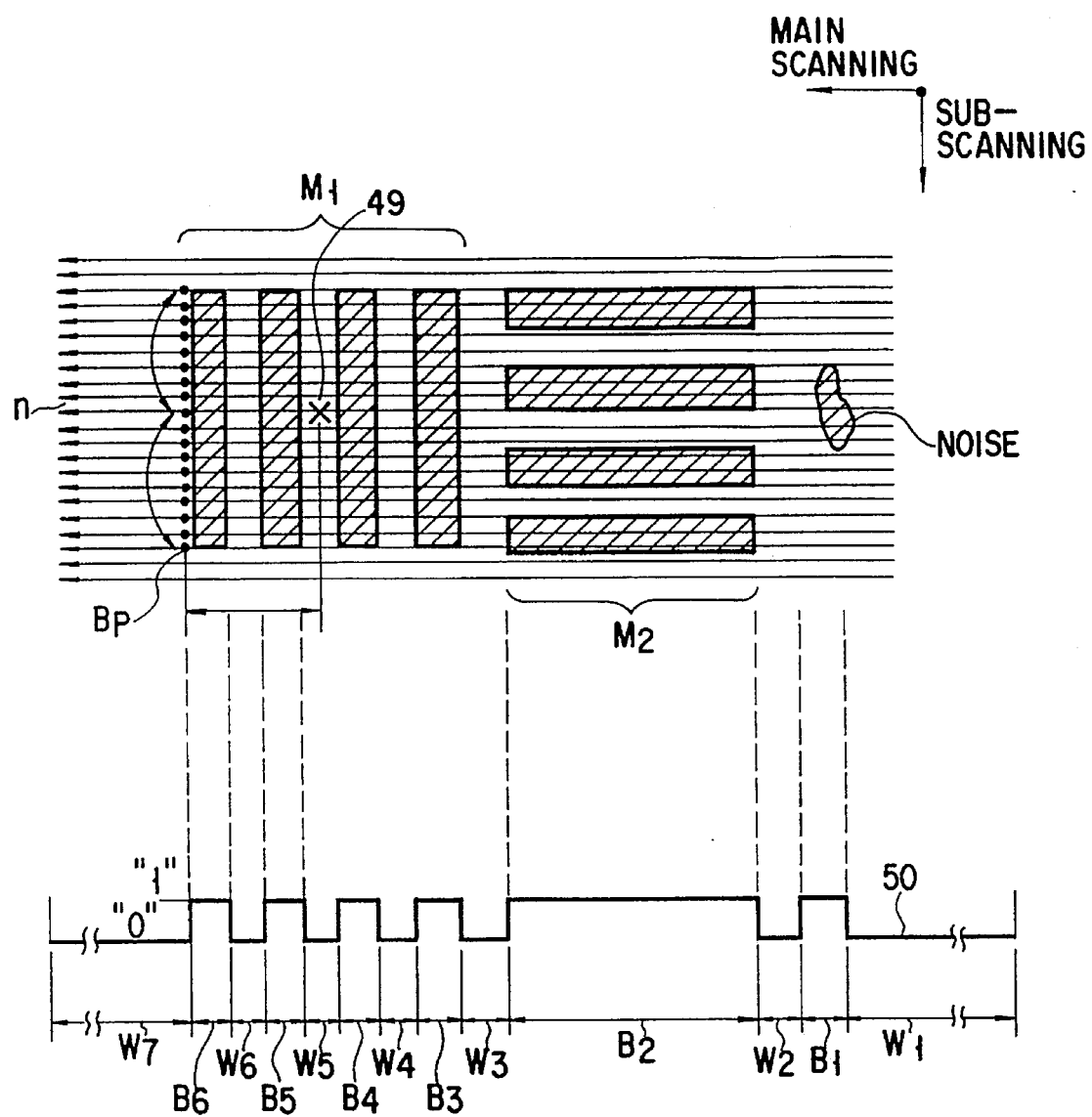
FIG. 4 is a diagram for illustrating the run-length converting process.

The run-length converting technique is an already known technique and an example of a case wherein an image near the landmarks 25, 26 is expressed by use of the run length is shown in FIG. 4. One landmark is constructed by four black bar codes M1 which are perpendicular to the main scanning direction and horizontal four black bar codes M2 and the state of the run length of the n-th scanning line can be expressed by a signal 50, for example.

The state of the run length is expressed in the same manner for each scanning line in the entire scanning area over the entire range in the main scanning direction, for example, by use of continuous amounts W1, W2,—of the white signal and continuous amounts B1, B2,—of the black signal. In FIG. 4, a central point of the landmark is shown.

Referring to FIG. 2 again, the run-length data is stored into a run-length data memory 41 and the binary data is stored into a binary image memory 42. Further, run-length data output in synchronism with the scanning is input to the mark detecting section 32, the characteristic of the landmark is determined, and when it is determined as a landmark candidate point, the point is stored into a mark image memory 43 as a binary image.

The mark detecting section 32 is used to detect whether or not the run-length data has the predetermined characteristic of the landmark, and in this case, the characteristic of the landmark is determined according to whether or not the total length of four discrete black stripes of black, white, black, white, black, white and black lies in a preset range, and if the condition of determination is satisfied, data corresponding to the coordinates of a pixel first appearing after the finally detected black run-length data is stored into the mark image memory 43 as a landmark candidate point (black dot marks Bp in FIG. 4).

FIG. 5 shows landmark candidate points obtained by scanning the mail P and plotted on a mail area 51. As is clearly seen from FIG. 4, in a portion (bar code M1) of the landmark which intersects the main scanning direction at right angles, the candidate point Bp is output and the thus output candidate points Bp are arranged to make a line in the sub-scanning direction according to the size of the landmark and the resolution of the sub-scanning.

Therefore, in the sample mail P in FIG. 3, candidate points as shown in FIG. 5 are output and stored into the mark image memory 43. A head line detecting section 33 detects a group of candidate points by use of the relation between adjacent candidate points. That is, candidate points obtained according to the predetermined size and the scanning resolution must be detected as points larger than a predetermined size in the main scanning direction or sub-scanning direction. The thus detected landmark end portions 52, 53 are expressed as shown in FIG. 5 and, for example, a landmark candidate point 56 which does not meet the condition of detection is neglected.

The central point of the landmark is derived based on the landmark characteristic from the landmark end portion 52, 53. That is, a continuous amount of black, white, black, white is derived by scanning an image space already stored in the binary image memory 42 in the main scanning direction from the center of the landmark end portion group again and the centers of the continuous amounts of the final white are expressed by x marks 54, 55 in FIG. 5 as the centers of the detected landmarks.

In the example of FIG. 5, since two points 54, 55 are detected as the candidate points of the landmark center and a line connecting the two points extends in the sub-scanning direction, the line connecting the two points can be defined as a central line of the head line of the address information.

The size (width) of the landmark in the main scanning direction is determined in the same manner as in the case wherein the center of the landmark is derived as described before and the size thereof (on one scanning line) is determined by reading and scanning an image in the binary image memory 42.

The character width having some redundancy and obtained by taking rotation between the marks into consideration can be determined according to the coordinates of the central points 54, 55 of the landmarks and the width of the landmark. By use of the character width, an area connecting the central points of the landmarks is determined as a head line area 57 of the address information.

The area of the head line is determined, but one of the end points corresponding to the head character of the address information is determined according to one of four states shown respectively in FIG. 6(a), FIG. 6(b), FIG. 6(c) and FIG. 6(d) depending on the direction of a line connecting the detected central points of the landmarks.

Figure 6A:
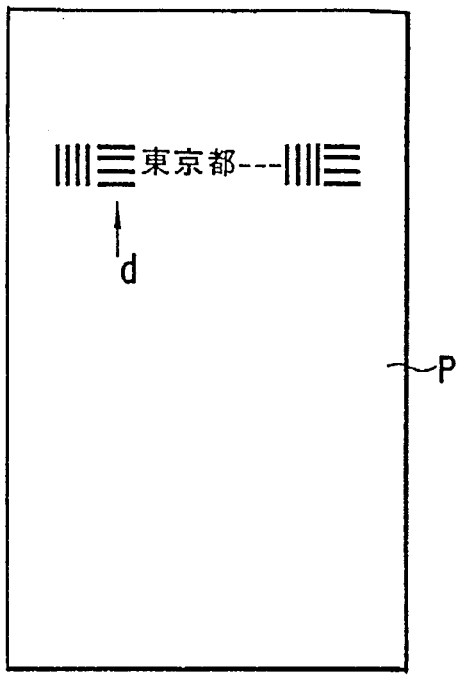
FIG. 6A–6D are diagrams illustrating a method for determining the reading direction of address information.
Figure 6C:
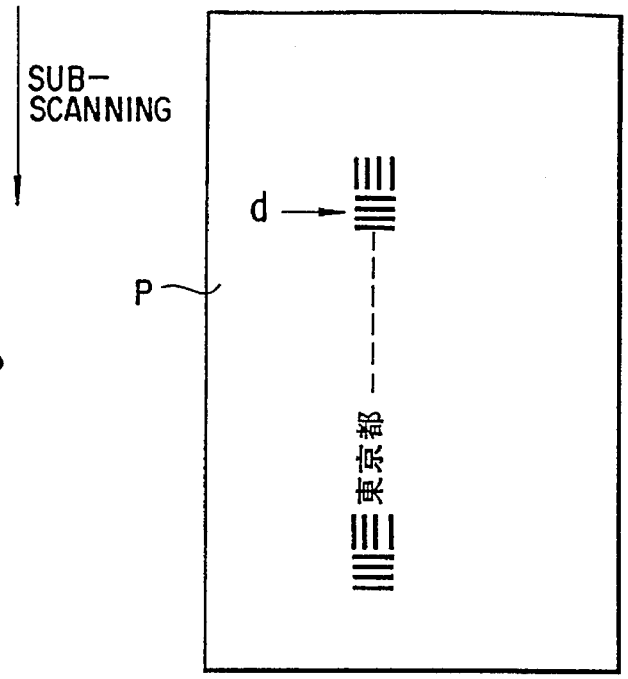
Figure 6B:
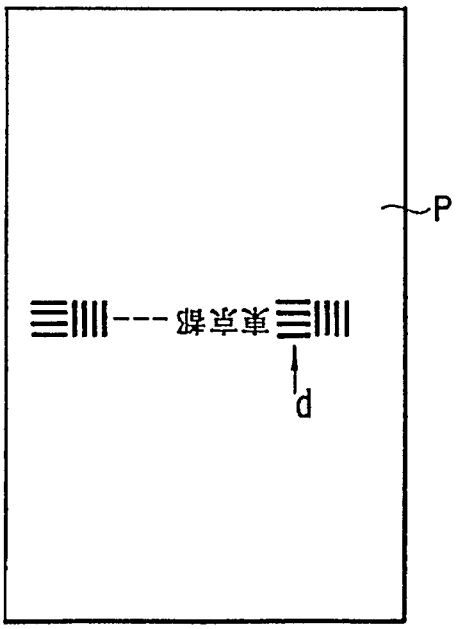

In the states shown by FIGS. 6(a) and FIG. 6(b), the character line of the address information is set in parallel to the main scanning direction, and in this case, distinction between the states shown in FIGS. 6(a) and FIG. 6(b) is made by detecting the side on which the landmark constructed by four stripes intersecting at right angles with the landmark detected in a preset area in a direction from the central points of the landmarks to the center between the marks lies. In this case, a detected side corresponds to the head.

Figure 6D:
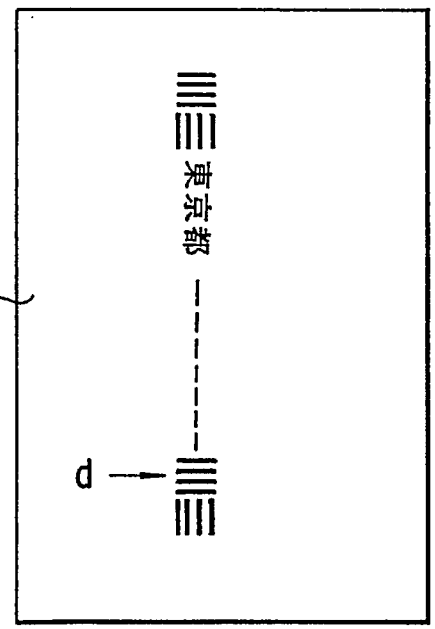

Further, in a case where the direction of a line connecting the central points of the landmarks is the same as the sub-scanning direction, the states shown by FIGS. 6(c) and 6(d) are obtained, and in this case, the same process as that effected in the case of the states shown by FIGS. 6(a) and 6(b) is effected and a detected side corresponds to the end of the address reading. An arrow d in FIGS. 6(a)–6(d) indicates the landmark detected in the above process.

The above processes are effected by the head line detecting section 33 and the reading order and area detection of the head line are determined by accessing the mark image memory 43, binary image memory 42 or run-length data memory 41.

The thus obtained information is transferred to the character detection/extraction section 34. The process in the character detection/extraction section 34 is to effect the detection/extraction process for each character unit using the run-length data memory 41 or binary image memory 42 storing the character line image between the landmarks, create coordinate data on the detected character line area space for each character unit, and transfer the same to the character recognizing section 36. At the same time, the character detection/extraction section 34 transfers a character line area image necessary for character recognition from the binary image memory 42 to the image memory 44 for recognition.

The character recognizing section 36 extracts a character image from the image memory 44 based on coordinate data of character detection/extraction previously given and collates the character image with the contents of a previously prepared character dictionary 35 to effect the character recognizing process. Then, the character recognizing section 36 outputs an upper candidate of the recognition process for each character detection/extraction unit to a next-stage word knowledge processing section 38 as the result of recognition process. The character detection/extraction process is effected by the technique disclosed in U.S. Pat. No. 4,481,665, for example.

The word knowledge processing section 38 treats the character array obtained according to the order from the head character to the final character as a candidate line indicating the ambiguity of the process of the character recognizing section 36, evaluates the word array of address information and effects the word evaluation for a portion up to the name of a town except the numeral portion of the address information by use of a previously prepared word dictionary 37 and outputs the result of recognition for the portion up to the name of the town.

In the processes for character detection, character recognition and word knowledge, a character line following the head line is detected when necessary according to a portion of the address information which is described in the head line of the address information detected by the landmarks and the character line is treated as an object to be recognized. The above processes are effected by the above-described sections in a pipeline fashion in a manner similar to a method for detecting the head line as required. The processes for character detection, character recognition and word knowledge may be effected by use of the technique disclosed in U.S. Pat. No. 5,020,117, for example.

The word dictionary processing section 38 outputs the result of recognition of a portion up to the name of the town and outputs coordinate data of the head line to a block/ward recognizing section 40 in order to make the end point thereof clear. When the above coordinate data is acquired, the ward/block recognizing section 40 extracts a character line area following the above coordinate data and effects the succeeding recognizing process. Detection of a next line after the detection of the head line is fed back to the preceding stage process via the recognition control section 46 to create a recognition loop again.

The image memory 45 is exclusively used for the block/ward recognizing section 40, and since the word process cannot be used for recognition of numerals unlike the name of a town, the independent performance of the recognizing process becomes part of the result of recognition of address information as it is. Therefore, the image memory 45 is constructed to have a memory construction which permits high-speed random access which can be used for specific recognition process utilizing the construction characteristic as the recognizing process.

Figure 7:
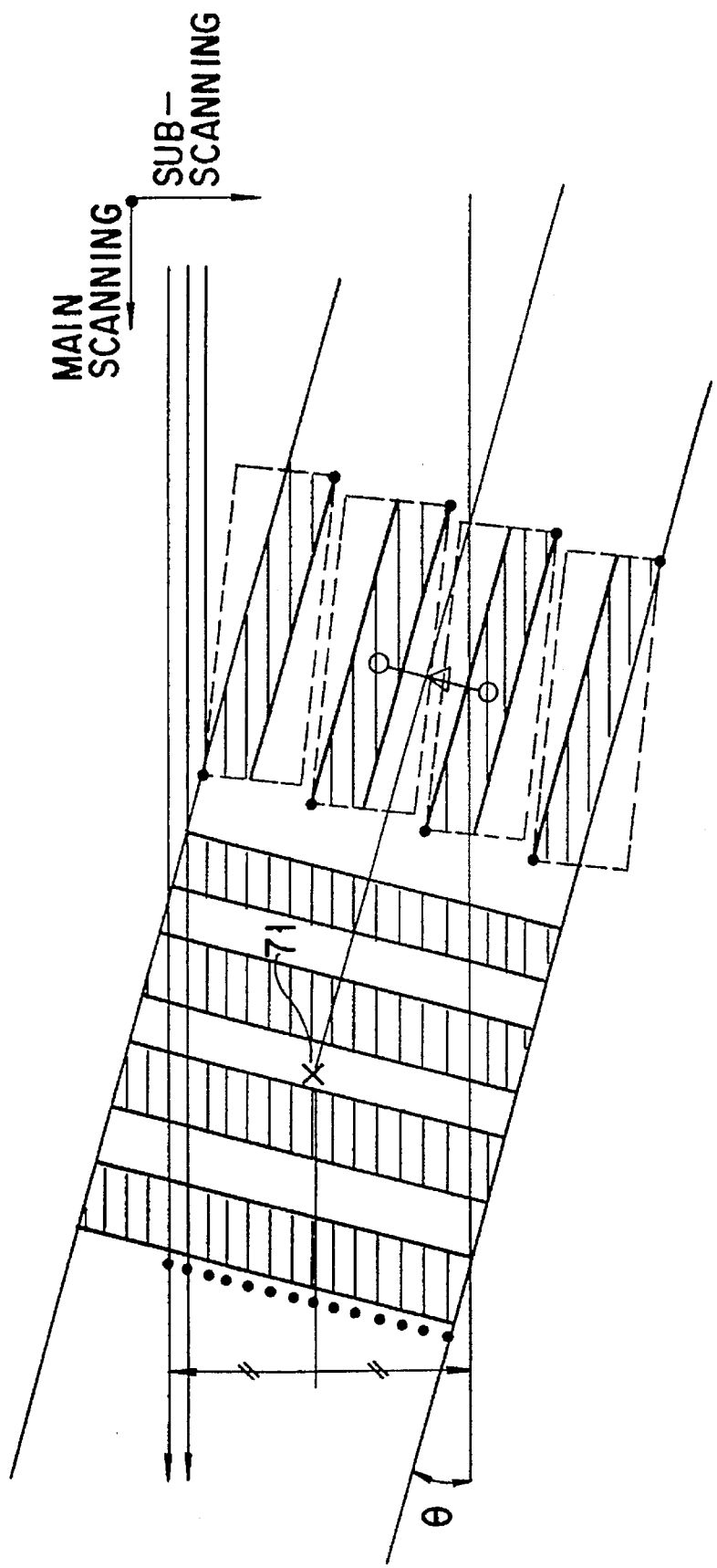
FIG. 7 is a diagram for illustrating a process when the landmark is subjected to rotation.

FIG. 7 illustrates the output state of the candidate point of the end portion of a landmark by use of black dot marks when it is assumed that a character line of address information containing the landmark is rotated around the end portion of the mail P or it is rotated in the observing section 8 at the time of feeding of the mail P. The reason why the candidate point is detected is that the distance from one end to the other end of the four black bars which lie on both sides of each space area is limited by a specified value. Therefore, if the rotation angle θ of the landmark to the main scanning direction becomes larger, the number of detected candidate points becomes smaller, and the number of detected candidate points is reduced to one half at the time of θ=45°. At this time, candidate points appear on the adjacent marks intersecting at right angles. By observing the outputs of the two candidate points, the center of the landmark center with respect to the full rotation angle can be determined, but in practice, it is suitable to limit the rotation angle within ±15°.

Rotation of the landmark causes the determination of the number of connected and detected candidate points to have redundancy and makes it easier to detect the candidate point against noises other than the landmark on the mail P. In a case where no landmark is detected for evaluation of the landmark, it is determined that the landmark is not present.

FIG. 8 is a flowchart for illustrating the landmark detecting process and address reading process. In FIG. 8, the surface of the mail P is first subjected to the area scanning (S1), and in this period of time, the mark detecting section 32 is operated to extract characteristics. Then, at the time of completion of the scanning, the content of the mark image memory 43 is scanned to subject a group of detected candidate points to the connecting process (S2).

Next, whether or not the length and width of a block of the candidate points detected by the connecting process lie within the upper and lower limits (S3). If the size is within the preset range, the block is recognized as a landmark (S4) and the coordinate of the center of the landmark is detected by the algorithm explained before (S5). Coordinate data (X, Y) on the mail image space is input to a memory M(m). In this manner, all of the contents of the mark image memory 43 are searched and the central coordinates of the landmarks are detected.

This operation is effected until the search for all of the memory contents is completed (S6), and if the search is completed, whether two landmarks are present or not is checked (S7), and if it is "NO", the mail P is performed detection process again as except two landmarks (S9). If it is "YES", an area of preset width between the coordinates of the two landmarks is read as the character area of an address (S8).

Figure 9A:
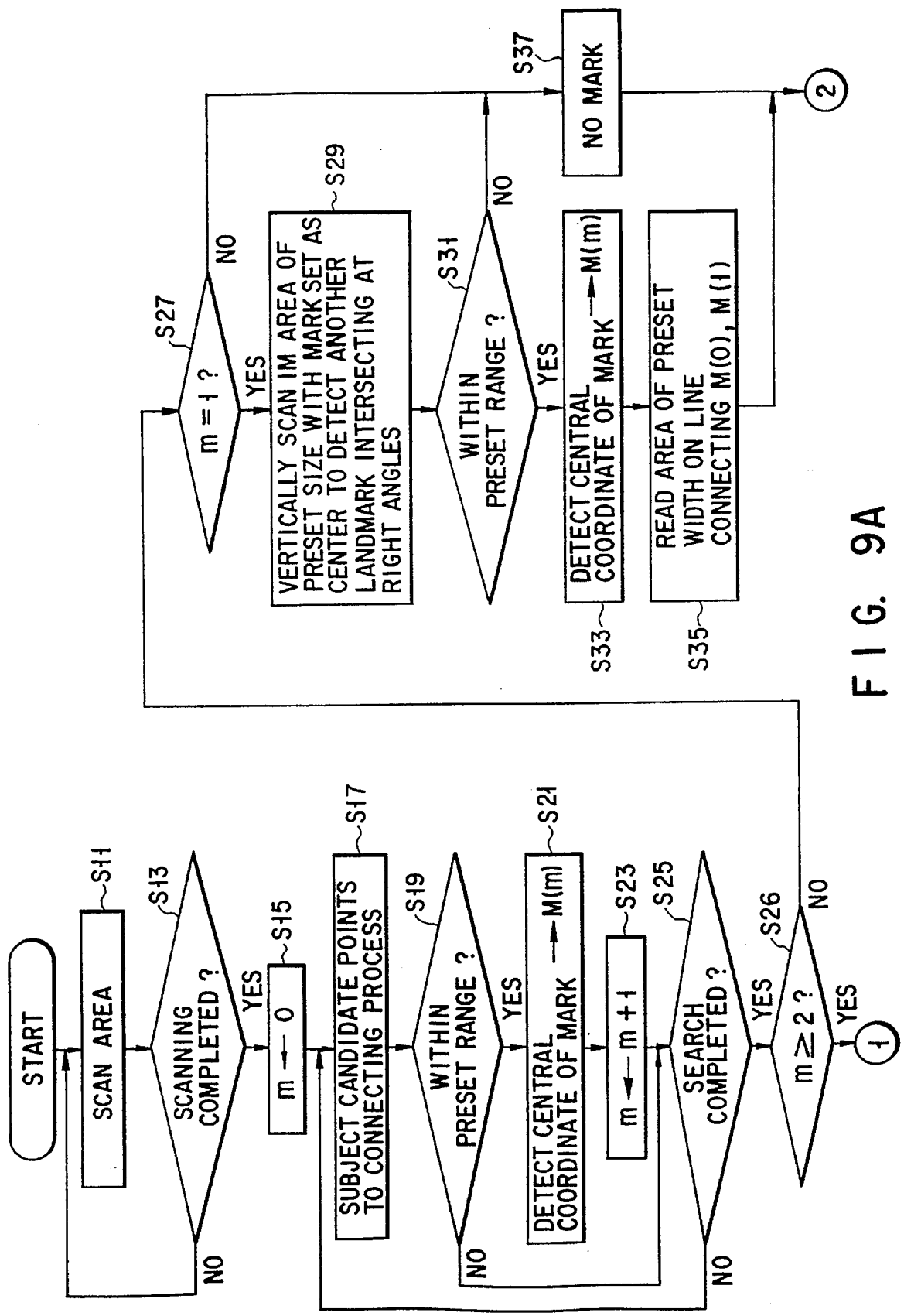
FIGS. 9A, 9B are flowcharts for illustrating the process according to the detected number of landmarks.
Figure 9B:
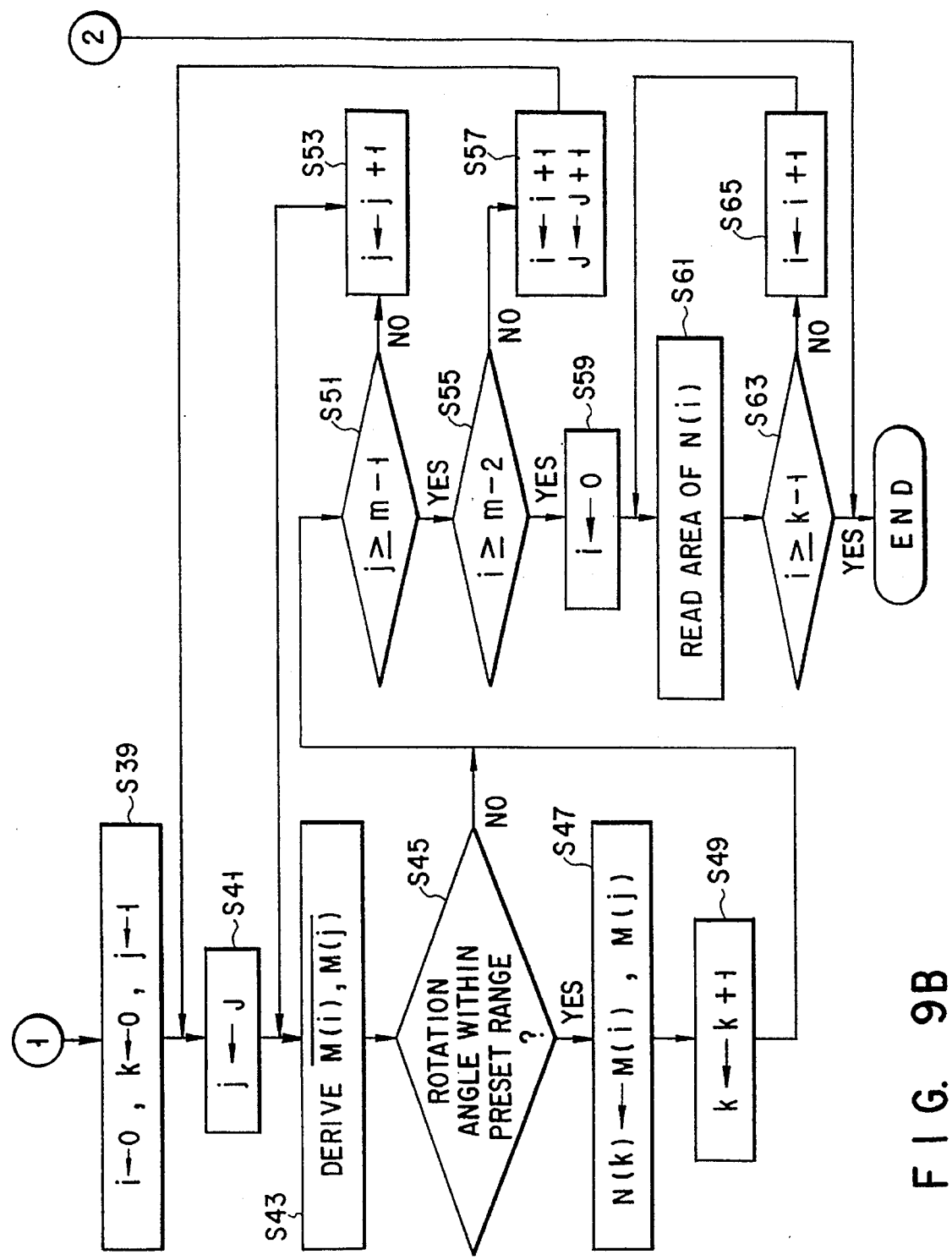

Further, in a case where two or more landmarks are detected, it is necessary to effect the process based on the flowcharts shown in FIGS. 9A, 9B according to the number of detected landmarks. In the flowcharts of FIGS. 9A, 9B, no special explanation for rotation between the landmarks when two or more landmarks are detected is additionally made. This is because the direction of the front end of the line with respect to the central point 71 of the landmark can be easily determined based on the two-character codes of the respective landmarks.

That is, as is clearly understood from the examples in (a) to (d) of FIG. 6 or M1, M2 of FIGS. 3, 4, the address or the like is described in an area between the two landmarks 26 and 25, a mark having four codes M2 extending in the horizontal direction and disposed adjacent to and on the right side of the four codes M1 extending in the vertical direction is an example of the landmark, a character line is extended in position on the right side thereof, and horizontally extending four codes M2 are disposed on the right side of vertically extending four codes M1 as another landmark. That is, briefly speaking, "vertical stripes, lateral stripes, address, vertical stripes, lateral stripes" are presented.

The binary image obtained by observation of the mail P is detected by a necessary synchronization signal on the real time basis and a concrete logical circuit therefor is explained later.

Further, the process effected in a case where a plurality of central points of the landmarks are detected is explained with reference to the flowcharts shown in FIGS. 9A, 9B.

The surface of the mail P is subjected to the area scanning, and in this period of time, the mark detecting section 32 is operated to extract characteristic points (S11). Then, at the time of completion of the scanning (S13), the content of the register m is set to "0" (S15), the content of the mark image memory 43 is scanned, and the detected candidate points of the same group are unified (S17).

Next, if the length and width of a block of the candidate points detected by the connecting process lie within the upper and lower limits (S19), the block is recognized as one landmark. Then, the coordinate of the center of the landmark is detected by the algorithm explained before (S21). Coordinate data (X, Y) on the mail image space is input to the memory M(m). In this manner, all of the contents of the mark image memory 43 are searched and the central coordinates of the landmarks are detected (S23).

The value of the register m obtained at this stage indicates the number of centers of the detected landmarks, and if the number is two, the state is determined to be normal and characters between the coordinates may be read as an address area. The process effected when the number is "0", "1", "3" or more is explained below.

The value of the register m is checked to determine the number of detected landmarks by checking whether m≧2 or not (S25). If it is "NO", the value of the register m is "0" or "1", and if the number of landmarks is "1" (S27), it is considered that another landmark cannot be successfully detected for some reason and a process is effected to detect the landmark. That is, an IM area of preset size is vertically scanned with the landmark set at the center to detect another landmark intersecting at right angles (S29). If some image is detected and the image is within the preset range of size (S31), the image is recognized as another landmark. Then, an area of preset width on a line connecting the landmarks M(0) and M(1) is read as an address area (S35).

At this stage, it is not clear that the detected landmark corresponds to the front end portion or rear end portion of the head line of the address information. Since the line direction of the address information is determined, the description form of the address information can be determined and the head line can be determined by subjecting portions before and after the landmarks M1, M2 to the recognition process for the line width having redundancy and set in parallel to the line direction of the address information. If all of the address information cannot be recognized by use of only the head line, a character line following the head line is recognized based on the description form of the head line and then the recognition process for the address information is completed.

As one example of a case wherein only one landmark can be detected, there is a case wherein an envelop using a cellophane window is used, the contents on which the address information is described are moved in the envelop, and one of the landmarks for determining the address information or the description form of the address information disappears from the cellophane window. Therefore, even when one landmark is detected by recognition of the address information and if the address information is concealed, the result of recognition of the address information will lead to an erroneous result.

When the content of the register m for storing the number of detected landmarks is "0", it is determined that no landmark has been detected (S37), and it is impossible to recognize the address information and the envelop is rejected as in a case wherein the detected image is determined to exceed the preset range of size in the step S31 and another landmark cannot be detected.

In a case where the content of the register m is two or more, it is determined that two or more landmarks M(0), M(1), M(2),—have been detected, line segments between all of the landmarks are derived and whether the landmarks are normal landmarks or not is determined by checking whether or not the line segments between the landmarks are within a preset rotation angle range.

That is, as the concrete process, variables i, k, J and the like are set and 0, 0, 1 are substituted into the variables as shown in the flowcharts of FIGS. 9A, 9B (S39). Next, J is substituted into the variable j (S41) and a line segment between M(i) and M(1) is derived (S43). Then, whether the length of the thus derived line segment is within a preset range or not is determined, the line segment whose length exceeds the preset range is eliminated, whether the line segment is normal or not is determined (S45) according to whether the rotation angle between the detected positions thereof with respect to the horizontal or vertical direction lies within a preset range (±20°), and if it is normal, the landmarks are determined to be a set of normal landmarks and the coordinates of the two landmarks are stored as N(1) (S47). Then, the value of k is counted up by one (S49).

If j is smaller than (m−1), j is counted up by one (S53) to check the next landmark and the process is returned to the step S43. If j is larger than (m−1), whether i is larger than (m−2) or not is checked (S55), and if it is larger than (m−2), it is determined that determination for all of the landmarks is completed. If it is smaller than (m−2), it is determined that determination for the line segments of all of the landmarks is not yet completed, and i and J are counted up by one, the process is returned to the step S41 and determination for the line segment between the other landmarks is made as described above (S57).

In the step S59, i is set to 0, and areas indicated by the coordinates N(0), N(1),—recognized as normal in the step S47 are sequentially read (S61). Whether reading of the areas for all of the coordinates N(i) is completed or not is determined (S63), i is sequentially counted up (S65), and address information for the reading areas of preset width for all of the coordinates N(i) is read (S61).

In a case where a plurality of address information area candidates are detected and address information for which the candidates seem to be correct is output, one of the address information candidates which has the largest total sum of word scores (obtained by accumulating the scores of the character recognition candidates in the word level) or which is determined to be nearer to the standard based on the description position defined by the line direction and line position of the address information candidate is output.

FIG. 10 is a logical circuit diagram showing a concrete example of the run-length converting section in the binary-coding/run-length converting section 31. Input binary coded data IMG is input to a data input terminal of a D-type flip-flop circuit 91 to set up the flip-flop circuit 91 in synchronism with a binary-coded data synchronizing signal VCP. As a result, an exclusive-OR circuit (EXOR) 92 receiving a reset output of the flip-flop circuit 91 and the binary-coded data IMG outputs "1" when the immediately preceding binary-coded data IMG and the output state of the flip-flop circuit 91 are different from each other.

An OR circuit 93 is supplied with an output of the exclusive-OR circuit 92 and a signal obtained by inverting a line synchronization signal (horizontal synchronization signal) LSYC by an inverter circuit 94. An output of the OR circuit 93 is inverted by an inverter circuit 95 and supplied to the enable input terminal and load input terminal of a counter 96. The synchronization signal VCP is input to the clock input terminal of the counter 96, and when an output of the exclusive-OR circuit 92 is "1", the load input terminal is made active and a fixed value "1" is loaded into the counter 96. Further, when the line synchronization signal LSYC is input, the fixed value "1" is also loaded into the counter 96.

When the line synchronization signal LSYC is "1", an output of the exclusive-OR circuit 92 for detecting the output of the flip-flop circuit 91 becomes "0" to activate the enable input terminal of the counter 96 via the OR circuit 93 and inverter circuit 95 so as to permit the counter 96 to count the period of duration.

The output of the counter 96 is connected to the input of a data latch circuit 97 and the synchronization signal of the latch circuit 97 is VCP which is the same as the synchronization signal of the counter 96. Therefore, an output of the counter 96 is saved into the data latch circuit 97 with a delay of one clock. Further, a set output of the flip-flop circuit 91 is supplied to the data latch circuit 97 as one input thereof. Also, an output of an AND circuit 98 supplied with an output of the OR circuit 93 and a mask signal MSK is supplied to the data latch circuit 97 as another input thereof. The state changing output of the OR circuit 93 supplies a signal with a delay of one clock as an input of the data latch circuit 97 in the active period of the mask signal MSK.

The data latch circuit 97 outputs data as run-length data LNG, a run-length synchronization signal LNGC synchronized with the synchronization signal VCP as a synchronization signal thereof, and data as status output data W/B of white and black of run-length data of the input binary-coded data IMG and supplies the data to the run-length data memory 41 or mark detecting section 32. In FIG. 10, an inverter circuit 99 and NAND circuit 100 are shown.

Figure 11:
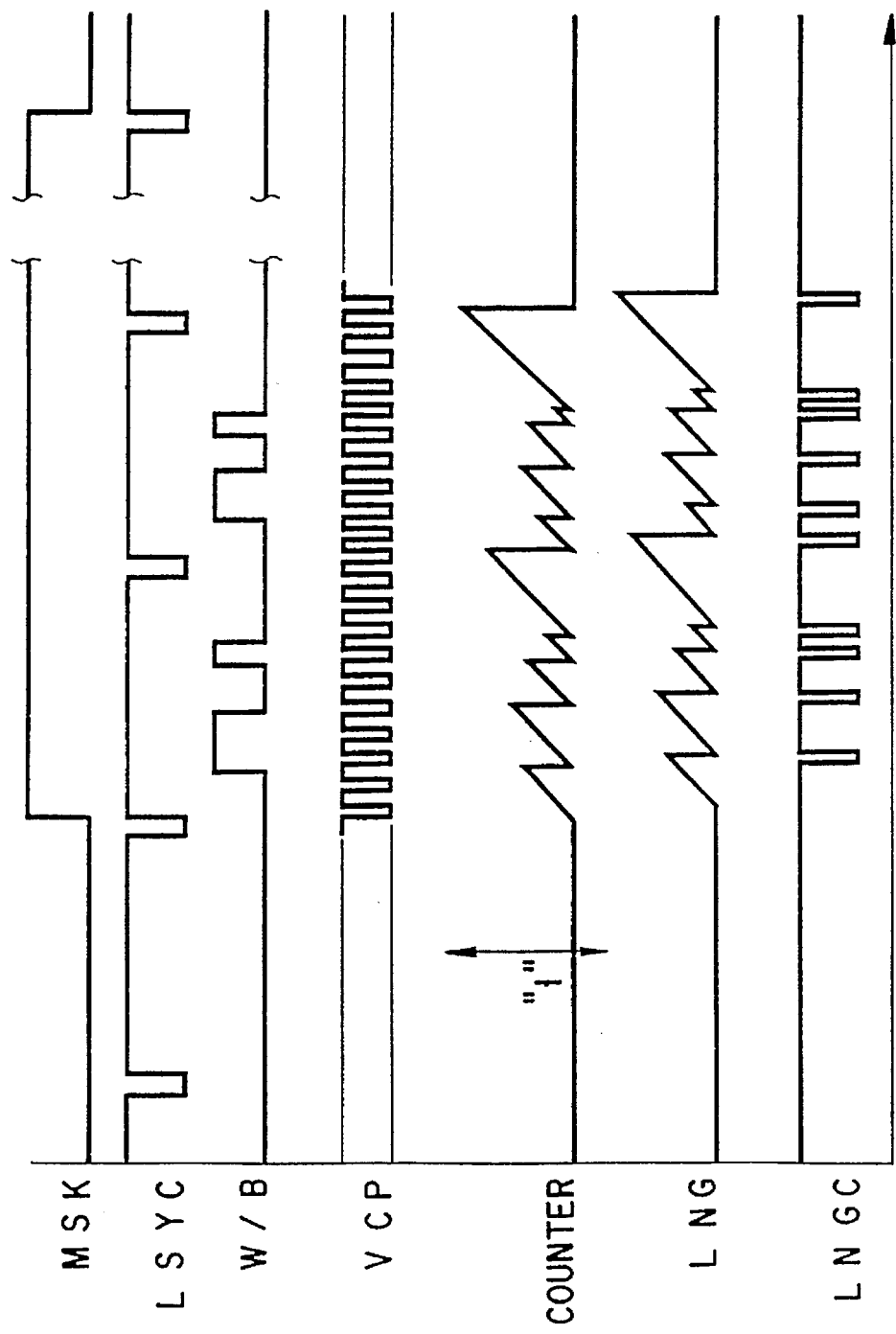
FIG. 11 is a timing chart for illustrating the operation of the run-length converting section.

FIG. 11 is a timing chart for illustrating data and synchronization signals in the run-length converting section described above and the operations of the circuits of FIG. 10 will be more clearly understood with reference to FIG. 11.

FIG. 12 is a logical circuit diagram showing a concrete example of the mark detecting section 32. The mark detecting section 32 is operated according to a horizontal synchronization signal LSYC, mask signal MSK and synchronization signal VCP supplied as inputs in addition to the run-length data LNG, white and black signal W/B explained in FIG. 10 and synchronization signal LNGC added to the above data.

The basic construction of the circuit includes a 1-bit shift register (SR) 105 for storing a white line or black line of 7 segments, and a data shift register (SRD) 106 for storing run-length data LNG of 7 segments. A landmark image of black "4" and white "3" starting from black data and ending in black data is checked by the shift register 105, and when the final stage output (7) is "1", the data is determined to be black and the run-length data corresponding to the black data is accumulated by adder circuits (ADD) 107, 108, 109, 110, 111, 112 as the sum of outputs (1) to (7) of the data shift register 106.

The accumulated data is supplied to comparators 116 and 117 as a B-side input thereof and fixedly set threshold values TH1 and TH2 are input to the respective comparators as A-side inputs thereof. The comparator 116 outputs a "1" signal when A>B and the comparator 117 outputs a "1" signal when A<B.

The function required for the mark detecting circuit 32 is to detect a landmark in one scanning operation and defines one of the conditions of detection for various noises (rotation, increase or decrease in the thickness of the black or white bar, or the like) imposed on the landmark and the distance starting from the black bar and ranging from the starting point to the end point of the four black stripes is used as the condition. If the condition is satisfied, an AND circuit 113 receiving an output of the shift register 105 and outputs of the comparators 116 and 117 outputs a "1" signal.

An output of the AND circuit 113 is input to the data input terminal of a D-type flip-flop circuit 114 and latched in synchronism with the synchronization signal VCP. By inputting an output of the AND circuit 113 and a reset output of the flip-flop circuit 114 to an AND circuit 115, a mark candidate point signal can be output immediately after the four black stripes. The mark candidate point signal is stored into the mark image memory 43 in synchronism with the synchronization signal VCP.

As the clear input for the shift register 105, data shift register 106 and flip-flop circuit 114, an output signal of a NOR circuit 116 supplied with the horizontal synchronization signal LSYC and mask signal MSK is used. This is so designed as to clear the contents of the registers 105, 106 and flip-flop circuit 114 for each horizontal line or for each starting of the scanning and initialize them.

Figure 13A:
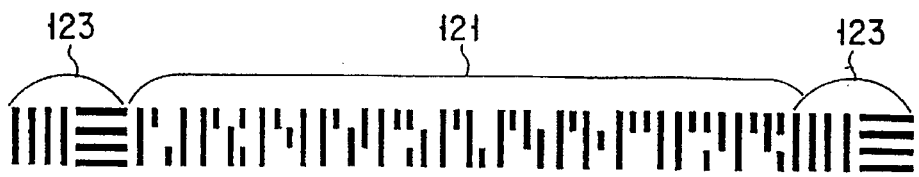
FIG. 13A is a diagram showing a concrete example in a case wherein address information is expressed by use of a machine code.
Figure 13B:
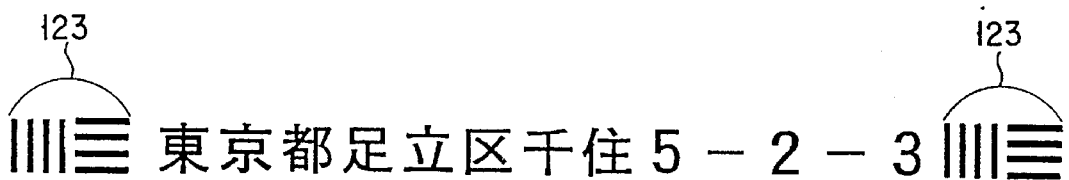
FIG. 13B is a diagram showing a concrete example in a case wherein address information is expressed together with landmarks.
Figure 13C:
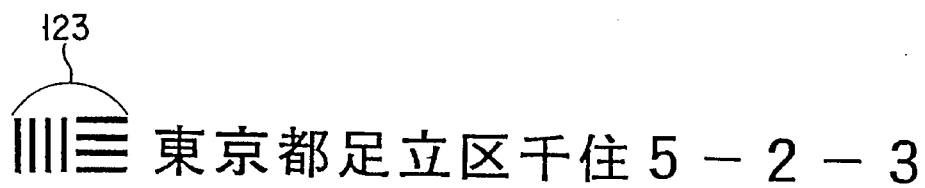
FIG. 13C is a diagram showing a concrete example in a case wherein address information is expressed together with a landmark.

FIG. 13A shows an example of a case wherein address information is read by printing the address information in the form of machine code which can be obtained by converting the address information in one-to-one correspondence and recognizing the machine code. FIG. 13B shows a case wherein the range of an address area by characters is defined by two landmarks expressed by the machine codes. FIG. 13C shows a case wherein one landmark is used, and in this case, only the starting point of the address area is specified. However, since the landmark has information relating to the direction thereof, the starting point of the address area and the description direction of the address can be specified by analyzing the landmark on the reading apparatus side and the character recognizing process after this can be smoothly effected.

In the reading of the machine code shown in FIG. 13A, it is difficult to detect the description area thereof if the machine code is printed in the complicated background on the mail P.

In the conventional method, a timing area which is always present in the code string as a code system is given to all of the codes and the code string is detected by detecting the connection of timing bars.

Figure 14:
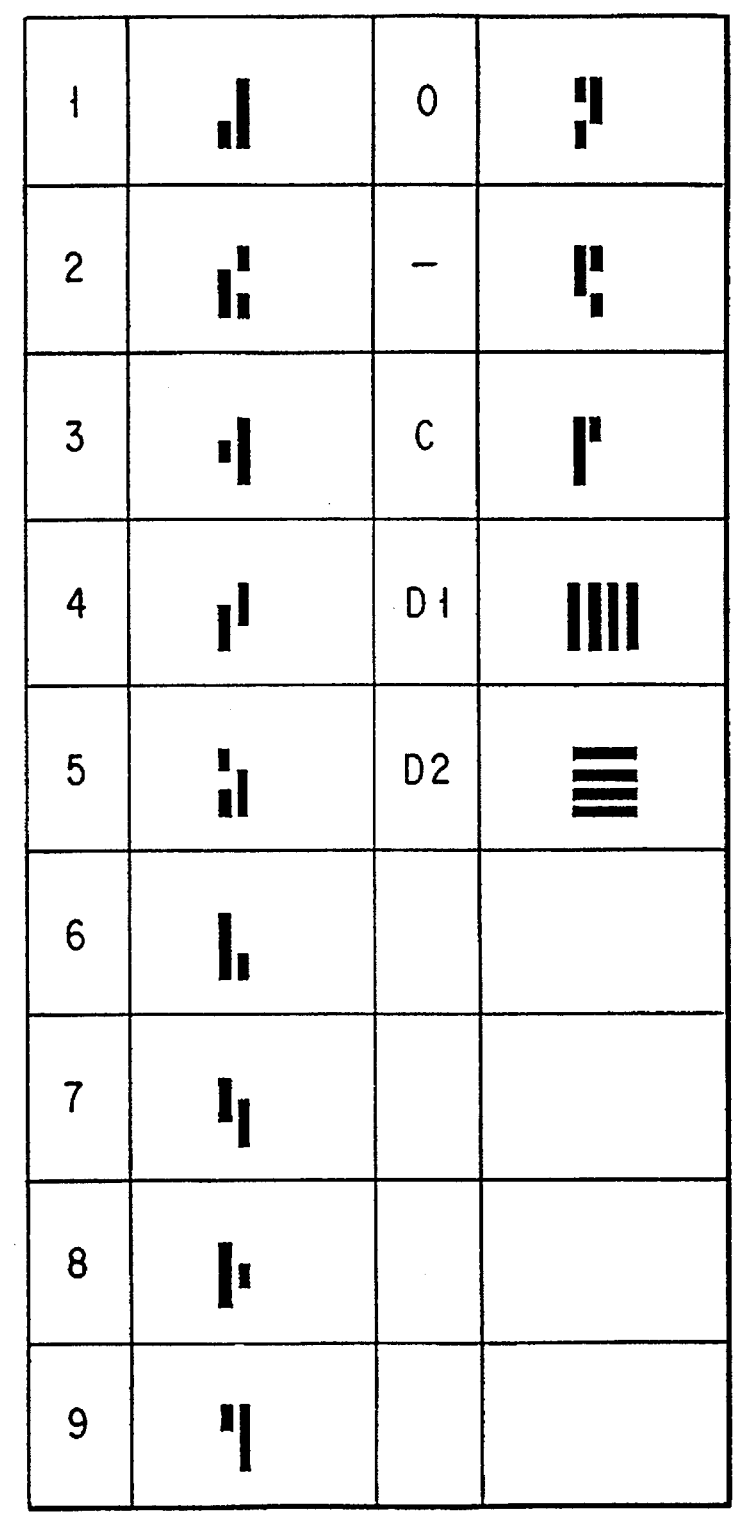

In the machine code in this embodiment, for example, a 7-state 2-bar code system shown in FIG. 14 is used to eliminate the timing area so as to enhance the expressive ability of each bar, reduce the number of bars expressing one character, and reduce the length of a bar code string 121 describing the address information.

The problem occurring at this time is how to achieve detection of the bar code string by attachment of the timing area. It can be easily detected in the same manner as in the method for detecting the address information by characters described before by determining the landmark in this embodiment by use of bar codes D1, D2 shown in FIG. 14 and printing the bar code string 121 describing the address information and landmarks 123 on both sides of the bar code string.

Figure 15:
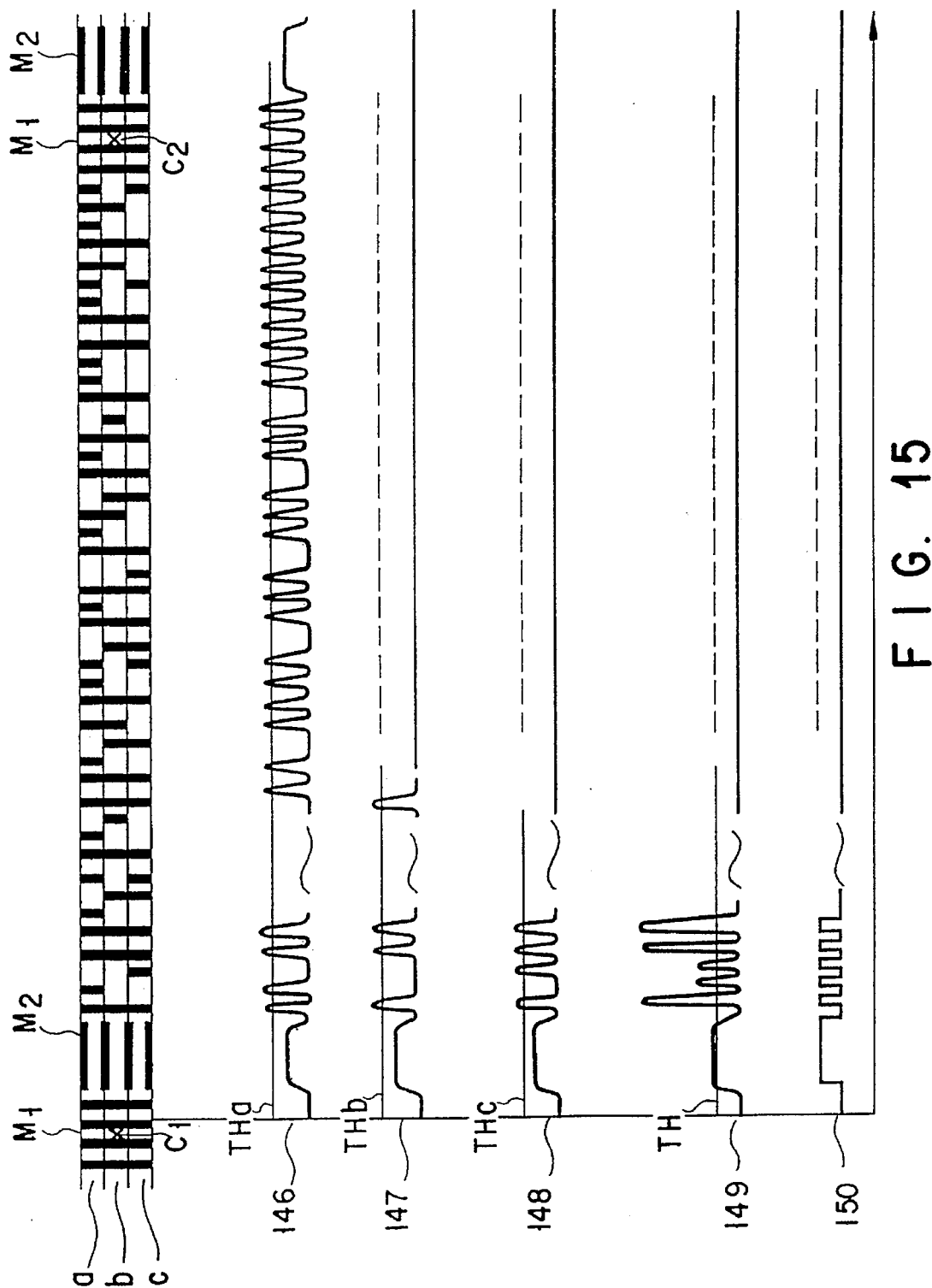
FIG. 15 is a diagram for illustrating a machine code reading process.

FIG. 15 shows an example of a method for reading bar codes in a case where address information is expressed in the bar code form shown in FIG. 14. After the landmark M1 or M2 is detected, the central position of the landmark is detected. The rotation angle of the bar code string with respect to the main scanning direction is derived from the thus detected central point C1 or C2 in the same manner as in the case of use of characters described before. Rotational correction is made on the binary image memory 42 to set the bar code string in parallel to the main scanning direction or sub-scanning direction, and then, the sizes of the landmarks M1, M2 are measured.

The landmark is divided into three portions in a direction perpendicular to the bar code direction according to the measured size to determine scanning areas shown in FIG. 15. In FIG. 15, the three-divided areas a, b and c are shown.

First, an integrated projective pattern 149 for the entire area of (a+b+c) is derived and it is subjected to the binary-coding process by use of threshold values THa, THb and THc. A binary-coded signal 150 obtained by the binary-coding process is used as a timing mark. Next, each of the divided areas a, b and c is searched in the period in which the timing mark is set at "1" so as to determine whether the area is black or white. Like the above case, the determination is effected by deriving integrated projective patterns 146, 147, 148 for the respective areas a, b, c and subjecting them to the binary-coding process by use of the threshold values THa, THb, THc.

Next, a character code is determined by determining whether six divided areas of two timings from the starting point of reading are black or white. In this case, a code of one character can be expressed by the states of six points in total and a checking function in the character level in which the states in two of the above points are white can be presented. Recognition of the bar code string containing the above checking process is effected.

In the above embodiment, the landmarks defining the address area are selected as the two landmarks 123, 123 of FIG. 13, but the mark in this invention is not limited to this configuration. If the mark defining the address area is a mark which can be printed on the envelop and specified on the address reading apparatus side, any type of mark can be used without degrading the effect of this invention.

Next, an address printing apparatus for printing address information and landmarks on the mail P is explained.

Figure 16:
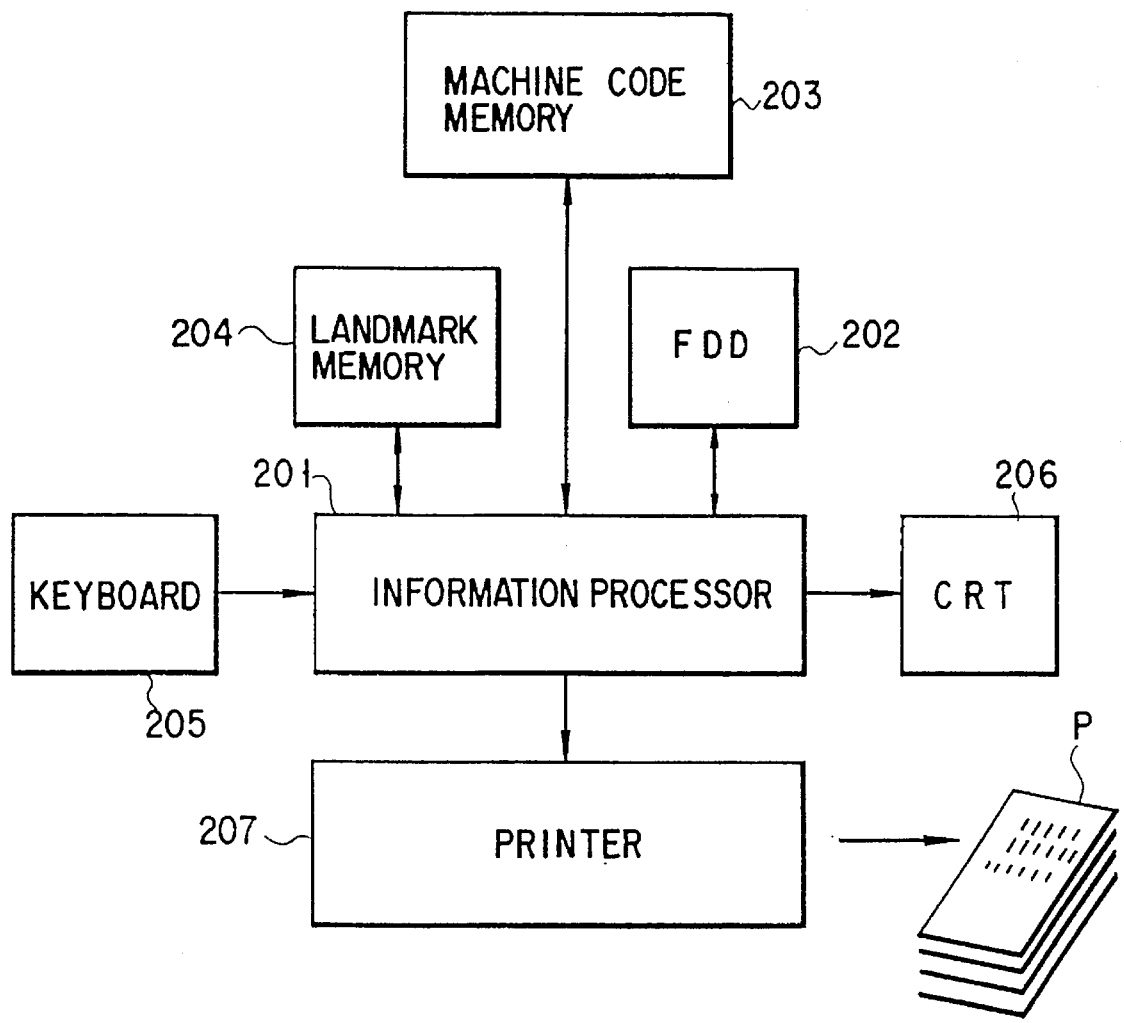
FIG. 16 is a construction diagram schematically showing the construction of a mail address printing apparatus.

FIG. 16 schematically shows the construction of the address printing apparatus for printing address information and landmarks on the mail P. In FIG. 16, an information processing section 201 is mainly constructed by a CPU and controls the whole portion of the apparatus, and it is connected to a floppy disk device (FDD) 202. It is assumed that an address data base previously containing various address information items is stored in a floppy disk set into the floppy disk device 202.

The information processing section 201 is connected to a machine code memory 203 having the machine codes described before previously stored therein and a landmark memory 204 having the landmark patterns described before previously registered (stored) therein. Further, the information processing section 201 is connected to a keyboard 205, CRT display 206, and a printer 207 for printing landmarks together with address information on the mail P set.

Next, this embodiment is explained with reference to the flowcharts shown in FIGS. 18A, 18B. FIG. 18A is a flowchart for illustrating the process in a case where the address information is printed together with the landmark of this invention, and FIG. 18B is a flowchart for illustrating the process in a case where the address information is printed together with the landmark of this invention by use of machine code.

In FIG. 18A, the address printing mode is first set by the keyboard 205, and if address information to be printed is specified, the information processing section 201 reads out specified address information from the floppy disk device 202 (S71). Then, when the address information is printed by use of only characters, the information processing section 201 checks and changes the form of the address information (S73) so that the character line of the address information can be set within the widths of a plurality of landmarks based on the assumption that the landmarks will be printed in preset positions.

Next, the information processing section 201 reads out a landmark pattern from the landmark memory 204 before printing the address information and then prints the front end landmark before the head position of the address information (S75). After this, the information processing section 201 prints part of the address information and prints the rear end landmark in the position at a preset distance from the printing position of the front end landmark (S77). The remaining part of the address information is printed after changing the line within the width of the landmarks as shown in FIG. 3 (S79).

In this case, above printing process includes not only printing the address on the mail, but also that printing the address and the mark on a seal etc. and affixing it to the mail, and that setting the address and the mark visible through the window of the envelope.

Figure 17:
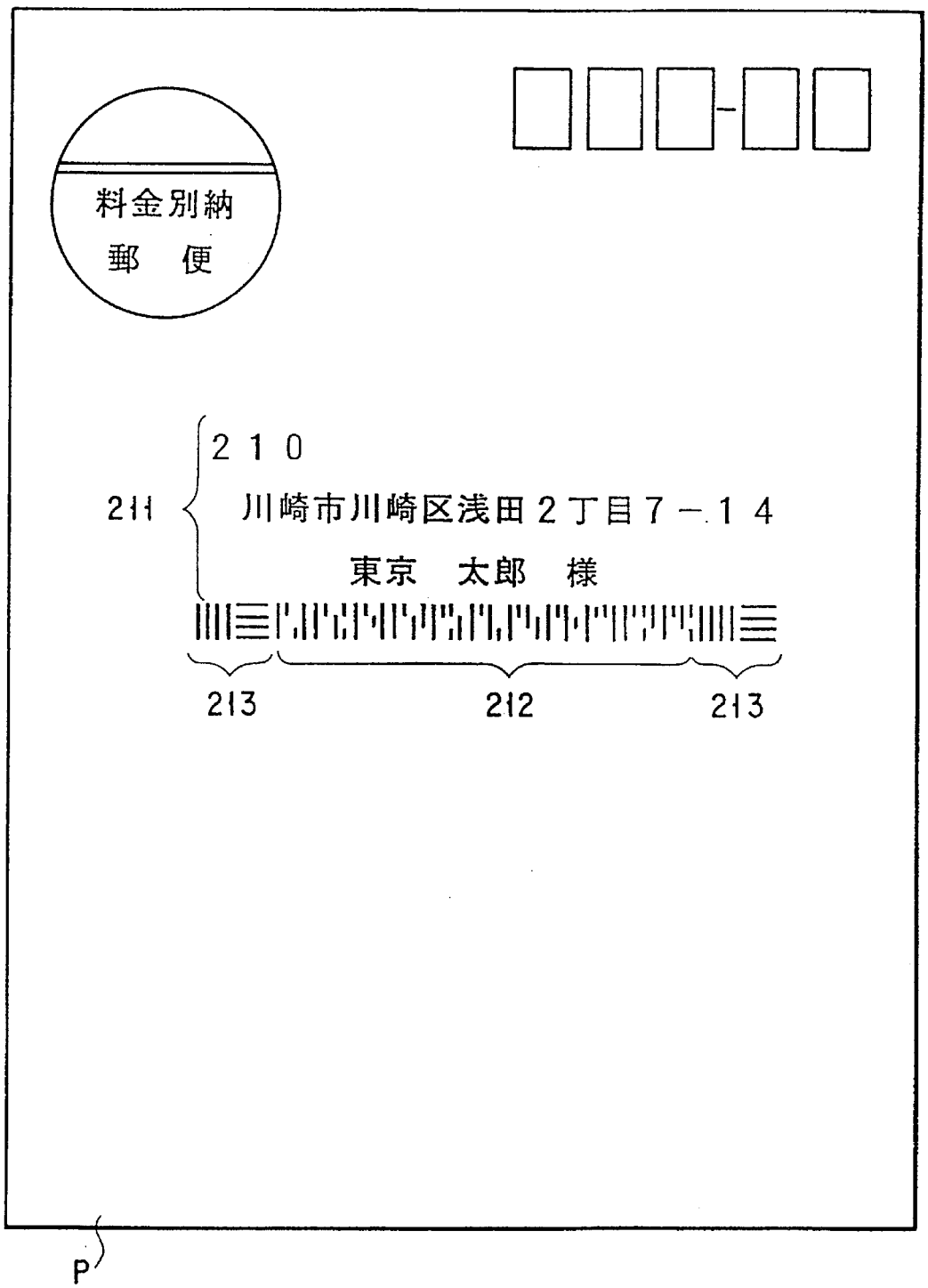
FIG. 17 is a plan view showing a concrete printing example of address information on the mail.

A case wherein the address information is printed in the form of machine code at the same time as the address information is printed by use of characters is shown in FIG. 17. In FIG. 17, address information 211 printed by characters, address information (machine code string) 212 printed by machine codes, address information 213 by machine codes, and landmarks 214 printed on both sides of the address information are shown.

The process is explained with reference to the flowchart of FIG. 18B. Like the former case, the information processing section 201 reads out specified address information from the floppy disk device 202 (S81). Next, the information processing section 201 reads out corresponding machine codes from the machine code memory 203 according to the readout address information so as to convert the address information into a machine code string (S83). Then, the information processing section 201 prints the address information by characters within the width of the landmarks (S85).

Next, the check digit calculation is effected to create a machine code string (S87). The check digit is already known in the art and, for example, it is used to express all data containing address information by machine codes and a check code by use of numerals and has a feature that the total sum of the numerals can be divided by a preset number. The check digit is created based on numerals obtained by reading address information and converting the address information up to the name of town according to a preset conversion rule.

After this, machine coded address information (machine code string) with two landmarks disposed on both sides thereof is printed below the address information expressed by characters (S89).

At this time, the distance between the landmarks is set within a preset range, and when the number of digits of the machine code string expressing the address information is not large enough to fill a space between the landmarks, machine codes such as symbols "-" as shown in FIG. 14 are inserted as dummy codes, for example. In this case, it is supposed that the code at the rear end (last digit) of the machine code string of the address information is allotted as a check digit.

Thus, according to the above embodiment, landmarks constructed by four equally spaced vertical bars and horizontal bars obtained by rotating the vertical bars by 90° and defining the front end and rear end of the head line of address information having a plurality of lines are printed on the front end and rear end together with the address information, and the head line of the address information can be determined by detecting the landmarks at the time of reading of the address information and the description form of the address information can be determined according to the contents of expression of the landmarks. Therefore, in the process of reading the address of the mail, even if various image information items other than a to-be-read object are present, the to-be-read object area and the description form of the address information can be easily detected, thereby significantly increasing the processing speed and enhancing the reliability of reading.

Further, the rotation angle of the reading line with respect to the reference side of the mail can be precisely detected and reading correction for the rotation in a wide range can be attained, thereby increasing the rate of successful reading. Also, the degree of freedom for design of the expression of address information of the mail can be enhanced.

Further, by printing the landmarks, the timing area which is conventionally required can be made unnecessary when address information used as a to-be-read object is expressed by machine codes, thereby making it possible to increase the density of the machine codes. Therefore, the length of the machine code string expressing the address information can be reduced. Thus, address information which must be expressed in two lines by use of conventional machine codes may be expressed in one line.

Further, the landmark is simple in construction and the two types of landmarks have the same construction and can be obtained by rotation of 90°. Therefore, the landmark can be easily checked at the time of reading of address information or at the letters window.

As described above, according to this invention, it is possible to provide a mail address reading apparatus, mail address area determining apparatus and mail address printing apparatus which can easily detect a to-be-read object area and the description form of address information even if various image information items other than the to-be-read object are present on the mail, thereby increasing the processing speed and enhancing the reliability of reading.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A mail address reading apparatus for reading an address of a mail which has a mark formed in a machine code form, the mark indicating a position of the address area of the mail, the mail address reading apparatus comprising:

means for deriving image data from the mail having an address area;

means for detecting the mark from the image data derived by the deriving means; and means for specifying the address area of the image data according to the position indicated by the mark and for reading the address for the image data of the specified area, wherein the mark has first and second marks, said specifying means includes first determining means for determining that the first mark is the upper left corner of the address area and second determining means for determining that the second mark is the upper right corner of the address area, the first and second marks are respectively constructed by two adjacent codes, one of the machine codes is a first machine code having a plurality of discrete black stripes extending in a vertical direction of an address of the mail and the other machine code is a second machine code having a plurality of black horizontal stripes extending in a horizontal direction and disposed adjacently on the right side of the first machine code.

2. An apparatus according to claim 1, wherein the detecting means derives central coordinates of all of the mark candidates, derives a line segment between the mark candidates, derives distance between all of the mark candidates, derives an angle between the line segment and the horizontal direction of the mail, and determines the correct mark from all of the mark candidates based on the distance and angle.

3. A mail address reading apparatus for reading an address of a mail which has a mark formed in a machine code form, the mark indicating a position of the address area of the mail, the mail address reading apparatus comprising:

means for deriving image data for the mail having an address area;

means for detecting the mark from the image data derived by the deriving means; and means for specifying the address area of the image data according to the position indicated by the mark and for reading the address for the image data of the specified area, wherein said detecting means specifies candidates of the mark based on the image data, derives central coordinates of all of the mark candidates, derives distances between all of the mark candidates, derives a line segment between the mark candidates, derives an angle between the line segment and the horizontal direction of the mail, and determines the correct mark from all of the mark candidates based on the distance and angle.

4. An apparatus according to claim 3, wherein the detecting means derives central coordinates of all of the mark candidates, derives a line segment between the mark candidates, derives distance between all of the mark candidates, derives an angle between the line segment and the horizontal direction of the mail, and determines the correct mark from all of the mark candidates based on the distance and angle.

5. A mail address reading apparatus for reading an address of a mail which has a mark formed in a machine code form, the mark indicating a position of the address area of the mail, the mail address reading apparatus comprising:

means for deriving image data for the mail having an address area;

means for detecting the mark from the image data derived by the deriving means; and means for specifying the address area of the image data according to the position indicated by the mark and for reading the address for the image data of the specified area, wherein said detecting means specifies candidates of the mark based on the image data, derives central coordinates of all of the mark candidates, derives distances between all of the mark candidates, derives a line segment between the mark candidates, derives an angle between the line segment and the horizontal direction of the mail, and determines the correct mark from all of the mark candidates based on the distance and angle, and wherein the detecting means includes means for dividing the mark into three portions according to a size of the mark.

6. A mail address reading apparatus for reading an address of a mail which has a mark formed in a machine code form, the mark indicating a position of the address area of the mail, the mail address reading apparatus comprising:

means for deriving image data for the mail having an address area;

means for detecting the mark from the image data derived by the deriving means;

means for specifying the address area of the image data according to the position indicated by the mark and for reading the address for the image data of the specified area, wherein said detecting means specifies candidates of the mark based on the image data, derives central coordinates of all of the mark candidates, derives distances between all of the mark candidates, derives a line segment between the mark candidates, derives an angle between the line segment and the horizontal direction of the mail, and determines the correct mark from all of the mark candidates based on the distance and angle; and means for determining whether or not a different mark is present in a preset area of one mark detected by said detecting means when said detecting means has detected one mark.

7. A mail address reading apparatus comprising:

means for scanning image information from mail having an address which is detected and which contains a mark indicating the position of an area in which the address is described;

means for connecting images of candidates of the mark among the scanned image information so as to output connected image data;

means for checking whether a size of the connected image data is within a preset range;

means for recognizing the connected image data as the mark when it is determined that the size is within the preset range;

means for detecting a central coordinate of the recognized mark;

means for determining whether the recognized mark has two marks or not; and means for reading the image data in an area between the coordinates of the two marks as an address.

8. A mail address printing apparatus comprising:

means for storing address information from mail on which the address information is described;

means for storing image information of a first mark indicating the position of the upper left corner of an address area in which the address information is described with respect to the vertical direction of the address area, and for storing image information of a second mark indicating the position of the upper right corner of an address area;

means for arranging the address information of the mail according to a preset address format;

means for printing the first mark according to the preset address format on the front surface of the mail;

means for printing part of the address information on the right side of the printed first mark with respect to the vertical direction of the address area and for printing the second mark in the position of the upper left corner of the address area; and means for printing the remaining part of the address information in a position following the printed address information in the address area.

9. A mail address reading apparatus for reading an address from mail having a mark formed in a machine code form, wherein the mark indicates a position of the address area of the mail and is constructed by two machine codes, one of the machine codes is a first machine code having a plurality of discrete black stripes extending in a vertical direction with respect to the vertical direction of an address off the mail, and the other machine code is a second machine code having a plurality of black lateral stripes extending in a horizontal direction and disposed on the right side of the first machine code, comprising:

means for deriving image data from the mail having an address area;

means for detecting the mark from the image data derived by the deriving means, the detecting means specifies candidates of the mark based on the image data, derives central coordinates of all of the mark candidates, derives a line segment between the mark candidates, derives distance between all of the mark candidates, derives an angle between the line segment and the horizontal direction of the mail, and determines the correct mark from all of the mark candidates based on the distance and angle; and means for specifying the address of the image data according to the position indicates by the mark reading the address for the image data of the specified area.

10. A mail address reading apparatus for reading an address of a mail which has a mark formed in a machine code form, the mark indicating a position of the address area of the mail, the mail address reading apparatus comprising:

means for deriving image data of the mail having an address area;

means for detecting the mark from the image data derived by the deriving means; and means for specifying the address area of the image data according to the position indicated by the mark and reading the address for the image data of the specified area;

wherein the mark has first and second marks, said specifying means includes first determining means for determining that the first mark is the left terminal of a last line of text of the address area and second determining means for determining that the second mark is the right terminal of the last line of text, the first and second marks are each respectively constructed by two adjacent codes, one of the machine codes is a first machine code having a plurality of discrete black stripes extending in a vertical direction on an address of the mail and the other machine code is a second machine code having a plurality of discrete black stripes extending in a horizontal direction and disposed adjacently on the right side of the first machine code.

11. A mail address reading apparatus for reading an address of a mail which has a mark formed in a machine code form, the mark indicating a position of the address area of the mail, the mail address reading apparatus comprising:

means for deriving image data of the mail having an address area;

means for detecting the mark from the image data derived by the deriving means; and means for specifying the address area of the image data according to the position indicated by the mark and reading the address for the image data of the specified area;

wherein the mark has first and second marks, said specifying means includes first determining means for determining that the first mark is the left terminal of a last line of text of the address area and second determining means for determining that the second mark is the right terminal of the last line of text, the first and second marks are each respectively constructed by two adjacent codes, one of the machine codes is a first machine code having a plurality of discrete black stripes extending in a vertical direction on an address of the mail and the other machine code is a second machine code having a plurality of discrete black stripes extending in a horizontal direction and disposed adjacently on the right side of the first machine code.

\* \* \* \* \*